(12) United States Patent
Wakabayashi et al.

(10) Patent No.: US 7,652,119 B2
(45) Date of Patent: Jan. 26, 2010

(54) CURABLE COMPOSITION

(75) Inventors: Katsuyu Wakabayashi, Osaka (JP); Hiroshi Iwakiri, Hyogo (JP); Masahiro Murakami, Kyoto (JP)

(73) Assignee: Kaneka Corporation, Osaka (JP)

( * ) Notice: Subject to any disclaimer, the term of this patent is extended or adjusted under 35 U.S.C. 154(b) by 187 days.

(21) Appl. No.: 11/667,459

(22) PCT Filed: Nov. 9, 2005

(86) PCT No.: PCT/JP2005/020501

§ 371 (c)(1),
(2), (4) Date: May 10, 2007

(87) PCT Pub. No.: WO2006/051799

PCT Pub. Date: May 18, 2006

(65) Prior Publication Data

US 2007/0265409 A1    Nov. 15, 2007

(30) Foreign Application Priority Data

Nov. 11, 2004  (JP) .............. 2004-328241

(51) Int. Cl.
*C08G 77/00*    (2006.01)
*C08G 77/24*    (2006.01)

(52) U.S. Cl. .............. 528/36; 528/39; 528/43

(58) Field of Classification Search ............. 528/36, 528/39, 43
See application file for complete search history.

(56) References Cited

U.S. PATENT DOCUMENTS

| | | | | |
|---|---|---|---|---|
| 3,296,195 A | * | 1/1967 | Goossens | 528/34 |
| 3,398,044 A | * | 8/1968 | Plueddemann | 442/293 |
| 3,441,534 A | * | 4/1969 | Knaub | 524/860 |
| 3,689,454 A | * | 9/1972 | Smith et al. | 528/17 |
| 3,708,467 A | * | 1/1973 | Smith et al. | 528/17 |
| 3,714,089 A | * | 1/1973 | Hamilton et al. | 528/18 |
| 3,845,161 A | * | 10/1974 | Beers | 528/33 |
| 4,404,348 A | * | 9/1983 | Fau et al. | 528/15 |
| 4,963,626 A | | 10/1990 | Hirose et al. | |
| 5,681,914 A | * | 10/1997 | Kobayashi et al. | 528/18 |
| 6,172,150 B1 | * | 1/2001 | Kollmann et al. | 524/379 |
| 6,203,912 B1 | * | 3/2001 | Watakabe et al. | 428/421 |
| 6,413,647 B1 | * | 7/2002 | Hayashi et al. | 428/447 |
| 2002/0084030 A1 | * | 7/2002 | Kotani et al. | 156/329 |
| 2003/0157340 A1 | * | 8/2003 | Shiota et al. | 428/446 |
| 2004/0005506 A1 | * | 1/2004 | Nishimura et al. | 430/17 |
| 2004/0039094 A1 | * | 2/2004 | Taylor | 524/261 |
| 2004/0266923 A1 | * | 12/2004 | Fehn et al. | 524/261 |
| 2005/0103109 A1 | * | 5/2005 | Hegner et al. | 73/706 |
| 2005/0272835 A1 | * | 12/2005 | Iwakiri et al. | 523/218 |
| 2006/0040110 A1 | * | 2/2006 | Kohmura et al. | 428/446 |
| 2006/0047034 A1 | * | 3/2006 | Sakurai et al. | 524/236 |

FOREIGN PATENT DOCUMENTS

| | | | |
|---|---|---|---|
| EP | 0 326 862 A2 | | 8/1989 |
| JP | 32-3742 B | | 2/1954 |
| JP | 52-73998 | | 6/1977 |
| JP | 63-6041 A | | 1/1988 |
| JP | 1-188557 A | | 7/1989 |
| JP | 1-188558 A | | 7/1989 |
| JP | 5-117519 A | | 5/1993 |
| JP | 2002-105265 A | | 4/2002 |
| WO | WO 2004011553 | * | 2/2004 |
| WO | WO 2004026765 A1 | * | 4/2004 |

\* cited by examiner

*Primary Examiner*—Randy Gulakowski
*Assistant Examiner*—Robert Loewe
(74) *Attorney, Agent, or Firm*—Sughrue Mion, PLLC

(57) ABSTRACT

A problem of the present invention is to provide a curable composition which gives good curability by use of a catalyst other than organic tin catalysts. The above problem is solved by a curable composition, comprising: (A) one or more polymers having a silicon-containing group which is crosslinkable by forming siloxane bonds, (B) an amine compound, and (C) a silicon compound having, as substituents on its silicon, at least one electron withdrawing group, and at least one group selected from the group consisting of alkoxy groups, alkenyloxy groups, acyloxy groups, and a hydroxyl group.

13 Claims, No Drawings

CURABLE COMPOSITION

FIELD OF THE INVENTION

The present invention relates to a curable composition containing one or more polymers having a silicon-containing group which has a hydroxyl group or hydrolyzable group bonded to the silicon atom and which is crosslinkable by forming siloxane bonds (and silicon-containing group may be referred to as a "reactive silicon group" hereinafter).

It is known that polymers each having, in the molecule thereof, at least one reactive silicon group have a nature that a siloxane bond is formed in company with hydrolysis reaction or the like of the reactive silicon group by moisture or the like even at room temperature, whereby the polymers are each crosslinked to give a rubbery cured product.

Out of these polymers having a reactive silicon group, polymers wherein the main chain skeleton thereof is a polyoxyalkylene polymer or polyisobutylene polymer are disclosed in JP-A-52-73998, JP-A-63-6041 and other pubulications. The polymers a real ready produced industrially, and are widely used in articles as a sealing compound, an adhesive, a paint and so on. Further, about curable compositions each made of a polymer wherein the main chain skeleton thereof is a polysiloxane, in particular, a diorganopolysiloxane, many suggestions are made in JP-B-32-3742 and other pubulications.

The curable composition used in a sealing compound, an adhesive, a paint or the like, and a rubbery curable product obtained by curing the composition are required to have various properties such as curability, adhesiveness, and mechanical property.

The curable composition containing a polymer having a reactive silicon group is cured by use of a silanol condensation catalyst and, usually, organic tin catalysts having a carbon-tin bond, such as dibutyltin bis (acetylacetonate), are widely used. In recent years, however, the toxicity of the organic tin compounds has been pointed out and development in catalysts other than the organic tin catalysts has been desired.

About catalysts other than organic tin catalysts, many researches are made on carboxylic acid metal salts, metal alkoxides and others. In particular, carboxylic acids or amine compounds are metal-free catalyst systems. Thus, it is expected that the effect thereof onto the environment is relatively small. JP-A-5-117519 discloses that a carboxylic acid and an amine are together used, thereby yielding a curable composition having a good curability.

DISCLOSURE OF THE INVENTION

Problems to be Solved by the Invention

However, as stated in JP-A-5-117519 also, according to an amine compound alone, a sufficient curability is not easily obtained. About the curable composition using a silanol catalyst wherein an amine compound and a carboxylic acid are together used, a sufficient adhesiveness may not be easily obtained. About the curability also, there is still room for an improvement thereon.

An object of the present invention is to provide a curable composition which is made mainly of a polymer having a reactive-silicon-containing group, and gives good curability and adhesiveness by use of a catalyst other than organic tin catalysts.

Means for Solving the Problems

In order to solve such problems, the inventors have made eager investigations so as to complete the following inventions:

That is, the present intention relates to:

(1) A curable composition, comprising:
(A) one or more polymers having a silicon-containing group which is crosslinkable by forming siloxane bonds,
(B) an amine compound, and
(C) a silicon compound having, as substituents on its silicon, at least one electron withdrawing group, and at least one group selected from the group consisting of alkoxy groups, alkenyloxy groups, acyloxy groups, and a hydroxyl group.

(2) The curable composition according to the above recitation,
wherein the polymer(s) of the component (A) has/have a number-average molecular weight of 3,000 to 100,000, and has/have one or more silicon-containing groups represented by the following general formula (1), on average per molecule:

$$-(SiR^1{}_{2-b}Z_bO)_l-SiR^2{}_{3-a}Z_a \qquad (1)$$

(wherein $R^1$ and $R^2$ each independently represent a substituted or unsubstituted hydrocarbon group having 1 to 20 carbon atoms, or a triorganosiloxy group represented by $(R')_3SiO-$ (wherein R's are each independently a substituted or unsubstituted hydrocarbon group having 1 to 20 carbon atoms), Zs each independently represent a hydroxyl or a hydrolyzable group, a is 0, 1, 2, or 3, b is 0, 1, or 2 provided that a case wherein a and b are 0 at the same time is not caused, and 1 is 0 or an integer of 1 to 19).

(3) The curable composition according to any one of the above recitations,
wherein the component (A) is partially or wholly a polymer having a silicon-containing group wherein the total number of hydrolyzable and hydroxyl groups which are bonded to its silicon atom is 3.

(4) The curable composition according to any one of the above recitations,
wherein the polymer(s) of the component (A) is/are one or more organic polymers having at least one main chain skeleton selected from the group consisting of polyoxyalkylene polymers, saturated hydrocarbon polymers, and (meth) acrylic acid ester polymers.

(5) The curable composition according to any one of the above recitations,
wherein Z is an alkoxy group.

(6) The curable composition according to the above recitation,
wherein the alkoxy group is a methoxy group.

(7) The curable composition according to any one of the above recitations,
wherein the molecular weight of the component (C) is 3,000 or less.

(8) The curable composition according to any one of the above recitations,
wherein the component (C) is a silicon compound represented by the following general formula (2):

$$R^3{}_{4-c-d}Y_cSiX_d \qquad (2)$$

(wherein $R^3$ represents a substituted or unsubstituted hydrocarbon group having 1 to 20 carbon atoms, or a triorganosiloxy group represented by $(R'')_3SiO-$ (wherein R''s are each independently a substituted or unsubstituted hydrocarbon group having 1 to 20 carbon atoms), Ys each independently represent a group selected from a hydroxyl group, alkoxy groups, alkenyloxy groups, and acyloxy groups, X is an electron withdrawing group, c is 1, 2, or 3, and d is 1, 2, or 3 provided that c+d is 4 or less).

(9) The curable composition according to the above recitation,
wherein at least one electron withdrawing group of the component (C) is an electron withdrawing alkyl group.

(10) The curable composition according to any one of the above recitations, wherein the electron withdrawing group X in the general formula (2) is an electron withdrawing alkyl group represented by the general formula (3):

$$—(CR^4_2)_m—CR^5_{3-e}W_e \qquad (3)$$

(wherein $R^4$s are each independently a hydrogen atom or a hydrocarbon group having 1 to 20 carbon atoms, $R^5$s are each a hydrogen atom or a hydrocarbon group having 1 to 20 carbon atoms, W is a group selected from perfluoroalkyl groups having 1 to 20 carbon atoms, a cyano group, halogens, —$OR^6$, —$NR^7R^8$, —$N=R^9$, and —$SR^{10}$ (wherein $R^6$, $R^7$, $R^8$ and $R^{10}$ are each a hydrogen atom, or a substituted or unsubstituted hydrocarbon group having 1 to 20 carbon atoms, and $R^9$ is a bivalent substituted or unsubstituted hydrocarbon group having 1 to 20 carbon atoms), e is 1, 2, or 3, and m is 0 or 1).

(11) The curable composition according to any one of the above recitations, wherein at least one electron withdrawing group of the component (C) is an electron withdrawing aryl group.

(12) The curable composition according to any one of the above recitations, wherein the electron withdrawing group X in the general formula (2) is an electron withdrawing aryl group represented by the following general formula (4):

$$—(Ar)V_f \qquad (4)$$

(wherein Ar represents an aromatic ring, and V is a group with which a hydrogen atom on the aromatic ring is substituted, and which is a group selected from halogens, acyl groups, alkoxycarbonyl groups, a nitro group, a cyano group, a sulfonyl group, and perfluoroalkyl groups, and f is 1 or more and is a number of hydrogen atoms on the aromatic ring which are able to be substituted).

(13) The curable composition according to the above recitation, wherein the aromatic ring Ar in the general formula (4) is a benzene ring (wherein f is an integer of 1 to 5).

(14) The curable composition according to any one of the above recitations, wherein at least one electron withdrawing group of the component (C) is a group selected from halogens, acyl groups, alkoxycarbonyl groups, a nitro group, a cyano group, and a sulfonyl group.

(15) The curable composition according to the above recitation, wherein at least one electron withdrawing group of the component (C) is fluorine.

(16) The curable composition according to any one of the above recitations, wherein the amine compound (B) is contained in an amount of 0.001 to 20 parts by weight and the silicon compound (C) is contained in an amount of 0.001 to 20 parts by weight for 100 parts by weight of the component (A).

(17) A one-component curable composition, using the curable composition according to any one of the above recitations.

(18) A sealing compound, using the curable composition according to any one of the above recitations.

(19) An adhesive, using the curable composition according to any one of the above recitations.

EFFECTS OF THE INVENTION

The curable composition of the present invention has good curability and adhesiveness although a catalyst other than organic tin catalysts is used.

BEST MODE FOR CARRYING OUT THE INVENTION

The present invention will be described in detail hereinafter.

The main skeleton of the polymer(s) used in the present invention, which has/have a reactive silicon group, is not particularly limited. Thus, polymers having various main skeletons can be used.

Specific examples thereof include polyoxyalkylene polymers such as polyoxyethylene, polyoxypropylene, polyoxybutylene, polyoxytetramethylene, polyoxyethylene-polyoxypropylene copolymer, polyoxypropylene-polyoxybutylene copolymer and the like; hydrocarbon polymers such as ethylene-propylene copolymer, polyisobutylene, copolymer made from isobutylene and isoprene or the like, polychloroprene, polyisoprene, copolymer made from isopreneorbutadiene, acrylonitrile, and/or styrene or the like, polybutadiene, copolymer made from isoprene or butadiene, acrylonitrile, and styrene or the like, hydrogenated polyolefin polymers obtained by hydrogenating these polyolefin polymers, and other hydrocarbon polymers; polyester polymers each obtained by condensing between a dibasic acid such as adipic acid and glycol, or by ring-opening-polymerizing a lactone; (meth)acrylic acid ester polymers each obtained by radical-polymerizing ethyl (meth)acrylate, butyl (meth)acrylate, or some other monomer; vinyl polymers each obtained by radical-polymerizing a (meth)acrylic acid ester monomer, vinyl acetate, acrylonitrile, styrene or some other monomer; graft polymers each obtained by polymerizing the vinyl monomer in any one of the above-mentioned polymers; polysulfide polymers; polyamide 6 obtained by ring-opening-polymerizing ε-caprolactam, polyamide 6,6 obtained by polycondensing hexamethylenediamine and adipic acid, polyamide 6,10 obtained by polycondensing hexamethylenediamine and sebacic acid, polyamide 11 obtained by polycondensing ε-aminoundecanoic acid, polyamide 12 obtained by ring-opening-polymerizing ε-aminolaurolactam, copolymer polyamides each having two or more components out of the above-mentioned polyamides, and other polyamide polymers; a polycarbonate polymer produced by polycondensing bisphenol A and carbonyl chloride; diallyl phthalate polymers; and other organic polymers. Polysiloxane polymers such as polydiorganosiloxane can also be used. More preferred are saturated hydrocarbon polymers such as polyisobutylene, hydrogenated polyisoprene and hydrogenated polybutadiene, the polyoxyalkylene polymers, the (meth)acrylic acid ester polymers, and the polysiloxane polymers since they have a relatively low glass transition temperature and give a cured product excellent in cold resistance.

The glass transition temperature of the polymer(s) of the component (A) is not particularly limited, and is preferably 20° C. or lower, more preferably 0° C. or lower, in particular preferably −20° C. or lower. If the glass transition temperature is higher than 20° C., the viscosity becomes high in winter or in cold districts so that the workability may deteriorate. Moreover, the flexibility of the cured product falls so that the elongation may lower. The glass transition temperature can be obtained by DSC measurement.

The polyoxyalkylene polymers and (meth)acrylic acid ester polymers are particularly preferred since they have high moisture permeability and can give a one-component composition excellent in depth curability and adhesiveness. The polyoxyalkylene polymers are most preferred.

The reactive silicon group contained in the reactive-silicon-group-containing polymer(s) is a group which has a hydroxyl group or hydrolyzable group bonded to a silicon atom and which can form a siloxane bond by reaction accelerated by a silanol condensation catalyst so as to be crosslinked. The reactive silicon group may be a group represented by the following general formula (1):

(wherein $R^1$ and $R^2$ each independently represent a substituted or unsubstituted hydrocarbon group having 1 to 20 carbon atoms, or a triorganosiloxy group represented by $(R')_3SiO$— (wherein R's are each independently a substituted or unsubstituted hydrocarbon group having 1 to 20 carbon atoms), Zs each independently represent a hydroxyl or a hydrolyzable group, a is 0, 1, 2, or 3, b is 0, 1, or 2 provided that a case wherein a and b are 0 at the same time is not caused, and l is 0 or an integer of 1 to 19).

The hydrolyzable group is not particularly limited, and may be a hydrolyzable group known in the prior art. Specific examples thereof include a hydrogen atom, halogen atoms, and alkoxy, acyloxy, ketoximate, amino, amide, acidamide, aminooxy, mercapto, alkenyloxy groups and the like. Among them, a hydrogen atom, and alkoxy, acyloxy, ketoximate, amino, amide, aminooxy, mercapto and alkenyloxy groups are preferred. The alkoxy groups are particularly preferred since the groups have mild hydrolyzability and good handleability.

One to three hydrolyzable groups or hydroxyl groups which are each the same as described above can be bonded onto the single silicon atom. The value of $(a+\Sigma b)$ is preferably from 1 to 5. When the hydrolyzable groups or hydroxyl groups the number of which is two or more are bonded into the reactive silicon group, they may be the same or different.

In particular, a reactive silicon group represented by the following general formula (5) is preferred since the group is easily available:

(wherein $R^2$ and Z have the same meanings as described above, and g is 1, 2, or 3).

Specific examples of $R^1$ and $R^2$ include alkyl groups such as a methyl, ethyl group and the like; cycloalkyl groups such as a cyclohexyl group and the like; aryl groups such as a phenyl group and the like; aralkyl groups such as a benzyl group and the like; and triorganosiloxy groups represented by $(R')_3SiO$— wherein R's are each a methyl, phenyl group, or the like. Among them, a methyl group is particularly preferred.

More specific examples of the reactive silicon group include trimethoxysilyl, triethoxysilyl, triisopropoxysilyl, dimethoxymethylsilyl, diethoxymethylsilyl, and diisopropoxymethylsilyl groups. More preferred are the trimethoxysilyl, triethoxysilyl and dimethoxymethylsilyl group, and particularly preferred is the trimethoxysilyl group since they have a high activity to give a good curability. From the viewpoint of storage stability, the dimethoxymethylsilyl group is particularly preferred. The triethoxysilyl group is particularly preferred since an alcohol generated in company with the hydrolysis reaction of the reactive silicon group is ethanol so that a higher safety is exhibited.

Polymers having a reactive silicon group having three hydrolyzable groups on a silicon atom are preferred since they tend to give a high curability and further supply a curable composition having good recovery property, durability, and creep resistance.

The reactive silicon group may be introduced by a known method. Specifically, the following methods can be exemplified:

(A) A polymer having in the molecule thereof a functional group such as a hydroxyl group is caused to react with an organic compound having an active group reactive with this functional group and an unsaturated group to yield a polymer having the unsaturated group. Alternatively, the polymer is copolymerized with an unsaturated-group-containing epoxy compound, thereby yielding an unsaturated-group-containing polymer. Next, the resultant reaction product is caused to act on a hydrosilane having a reactive silicon group, thereby hydrosililating the product.

(B) An unsaturated-group-containing polymer obtained in the same manner as in the method (A) is caused to react with a compound having a mercapto group and a reactive silicon group.

(C) A polymer having in the molecule thereof a functional group such as a hydroxyl group, epoxy group or isocyanate group is caused to react with a compound having a functional group reactive with this functional group and a reactive silicon group.

Out of the above-mentioned methods, the method (A) and the method of causing a polymer having a hydroxyl group at its terminal to react with a compound having an isocyanate group and a reactive silicon group among variations of the method (C) are preferred since a high conversion ratio can be obtained in a relatively short reaction time. The method (A) is particularly preferred since the reactive-silicon-group-containing polymer obtained by the method (A) becomes a curable composition having a lower viscosity and a better workability than the polymer obtained by the method (C) and the polymer obtained by the method (B) generates a strong odor based on mercaptosilane.

Specific examples of the hydrosilane used in the method (A) include halogenated silanes such as trichlorosilane, methyldichlorosilane, dimethylchlorosilane, and phenyldichlorosilane; alkoxysilanes such as trimethoxysilane, triethoxysilane, methyldiethoxysilane, methyldimethoxysilane, and phenyldimethoxysilane; acyloxysilanes such as methyldiacetoxysilane, and phenyldiacetoxysilane; and ketoximatesilane such as bis(dimethylketoximate)methylsilane, bis(cyclohexylketoximate)methylsilane and the like. However, the hydrosilane is not limited thereto. Among them, halogenated silanes, and alkoxysialnes are preferred, and alkoxysialnes are most preferred since they give a curable composition having a mild hydrolyzability and good handleability. Out of the alkoxysilanes, methyldimethoxysilane is particularly preferred since it is easily available and a curable composition containing the polymer obtained therefrom has high curability, storage stability, elongation property and tensile strength.

Out of the above-mentioned hydrosilanes, a hydrosilane represented by the following general formula (6) is preferred since a curable composition made of the polymer obtained by addition reaction of the hydrosilane compound has very good curability:

(wherein Z has the same meaning as described above). Out of hydrosilane compounds represented by the general formula (6), more preferred are trialkoxysilanes such as trimethoxysilane, triethoxysilane, triisopropoxysilane and the like.

Out of the trialkoxysialnes, a trialkoxysilane having an alkoxy group having one carbon atom (a methoxy group), such as trimethoxysilane and the like, may cause speedy advance of disproportionation reaction. When the disproportionation reaction advances, compounds having a very high reactivity, such as dimethoxysialne, are generated. From the viewpoint of safe handling, it is preferred to use a trialkoxysialne having an alkoxy group having 2 or more carbon atoms and represented by the following general formula (7):

(wherein $R^{11}$s, the number of which is three, are each independently an organic group having 2 to 20 carbon atoms). Triethoxysilane is most preferred from the viewpoint of availability and safe handling.

The synthesis method (B) may be, for example, a method of introducing a compound having a mercapto group and a reactive silicon group into an unsaturated bond moiety of the polymer by radical addition reaction in the presence of a radical initiator and/or a radical-generating source. However, the method (B) is not particularly limited. Specific examples of the compound having a mercapto group and a reactive silicon group include γ-mercaptopropyltrimethoxysilane, γ-mercaptopropylmethyldimethoxysialne, γ-mercaptopropyltriethoxysilane, γ-mercaptopropylmethyldiethoxysilane, mercaptomethyltriethoxysilane and the like. However, the compound is not limited thereto.

Out of variations of the synthesis method (C), the method of causing a polymer having a hydroxyl group at its terminal to react with a compound having an isocyanate group and a reactive silicon group may be, for example, a method disclosed in JP-A-3-47825. However, the method is not particularly limited. Specific examples of the compound having an isocyanate group and a reactive silicon group include γ-isocyanate propyltrimethoxysilane, γ-isocyanate propylmethyldimethoxysilane, γ-isocyanate propyltriethoxysilane, γ-isocyanatepropylmethyldiethoxysilane and the like. However, the compound is not limited thereto.

As described above, a silane compound wherein three hydrolyzable groups are bonded to a single silicon atom, such as trimethoxysilane, may cause advance of disproportionation reaction. When the disproportionation reaction advances, a considerably dangerous compound such as dimethoxysilane is generated. However, such disproportionation reaction does not advance about γ-mercaptopropyltrimethoxysilane or γ-isocyanate propyltrimethoxysilane. Therefore, in the case of using a group wherein three hydrolyzable groups are bonded to a single silicon atom, such as a trimethoxy group, as the silicon-containing group, it is preferred to use the synthesis method (B) or (C).

The polymer(s) having a reactive silicon group may be linear or branched, and the number-average molecular weight thereof, in terms of styrene according to GPC, is from about 3,000 to 100,000, more preferably from 3,000 to 50,000, in particular preferably from 3,000 to 30,000. If the number-average molecular weight is less than 500, inconveniences tend to be caused about the elongation property of the cured product. If the molecular weight is more than 100,000, the cured product comes to have a high viscosity so that inconveniences tend to be caused about workability.

In order to obtain a rubbery cured product exhibiting a high strength, a high elongation and a low elasticity, the number of reactive silicon groups contained in the polymer or each of the polymers is, on average, at least one, preferably from 1.1 to 5 per molecule of the polymer. If the number of the reactive silicon groups contained per molecule is less than one on average, the curability becomes insufficient so that a good rubbery elasticity behavior is not easily expressed. The reactive silicon groups may be present on a terminal of the main chain of the molecule chain of the polymer(s) or a terminal of a side chain thereof, or may be present on both of the terminals. In particular, when the reactive silicon groups are present only on a terminal of the main chain of the molecular chain, a rubbery cured product exhibiting a high strength, a high elongation and a low elasticity is easily obtained since the effective network length of the polymer component(s) contained in the cured product, which is finally formed, becomes long.

The above-mentioned polyoxyalkylene polymers are each a polymer which essentially has a repeating unit represented by the following general formula (8):

$$—R^{12}—O—\qquad(8)$$

(wherein $R^{12}$ is a linear or branched alkylene group having 1 to 14 carbon atoms). $R^{12}$ in the general formula (8) is preferably a linear or branched alkylene group having 1 to 14 carbon atoms, preferably 2 to 4 carbon atoms. Specific examples of the repeating unit represented by the general formula (8) include:

[Formula 1]

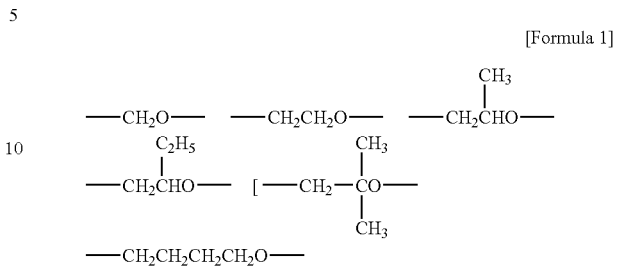

The main chain skeleton of the polyoxyalkylene polymer may be made of only one kind of repeating unit, or may be made of two or more kinds of repeating units. In the case that the composition is used, in particular, for a sealant, a material made of a polymer made mainly of a propylene oxide polymer is preferred since the material is amorphous and has a relatively low viscosity.

Examples of the method for synthesizing the polyoxyalkylene polymer include a polymerization method based on an alkali catalyst such as KOH, a polymerization method based on a transition metal compound/porphyrin complex catalyst obtained by reaction between an organic aluminum compound and porphyrin, as described in JP-A-61-215623, a polymerization method based on a double metal cyanide complex catalyst, as described in JP-B-46-27250, JP-B-59-15336, and U.S. Pat. Nos. 3,278,457, 3,278,458, 3,278,459, 3,427,256, 3,427,334, 3,427,335, and other publications; a polymerization method using a catalyst made of a polyphosphazene salt, as exemplified in JP-A-10-273512; and a polymerization method using a catalyst made of a phosphazene compound, as exemplified in JP-A-11-060722. However, the method is not limited thereto.

Examples of the method for producing the polyoxyalkylene polymer having a reactive silicon group include methods suggested in JP-B-45-36319 and 46-12154, JP-A-50-156599, 54-6096, 55-13767, 55-13468 and 57-164123, JP-B-3-2450, and U.S. Pat. Nos. 3,632,557, 4,345,053, 4,366,307, 4,960,844, and other publications; and polyoxyalkylene polymers having a number-average molecular weight of 6,000 or more and a Mw/Mn of 1.6 or less, which has a high molecular weight and a narrow molecular weight distribution, as suggested in JP-A-61-197631, 61-215622, 61-215623, 61-218632, 3-72527, 3-47825, and 8-231707. However, the method is not particularly limited thereto.

The above-mentioned polyoxyalkylene polymers having a reactive silicon group may be used alone or in combination of two or more thereof.

The saturated hydrocarbon polymers are each a polymer which does not substantially contain any carbon-carbon unsaturated bond other than those in an aromatic ring. The polymer which constitutes the skeleton thereof can be obtained by a method (1) of polymerizing, as a main monomer, an olefin compound having 2 to 6 carbon atoms, such as ethylene, propylene, 1-butene or isobutylene, a method (2) of homo-polymerizing a diene compound such as butadiene or isoprene, or copolymerizing the diene compound and one or more out of the above-mentioned olefin compounds, and then hydrogenating the homopolymer or copolymer, or some other methods. Isobutylene polymers or hydrogenated polybutadiene polymers are preferred since one or more functional groups can easily be introduced into a terminal thereof, the molecular weight thereof is easily controlled and further the number of the terminal functional groups can be made large. The isobutylene polymers are particularly preferred.

The polymer having a main chain skeleton made of a saturated hydrocarbon polymer has a very good characteristic in heat resistance, weather resistance, durability, and moisture blocking property.

The isobutylene polymers may each be a polymer wherein all of their monomer units are isobutylene units, or a copolymer made from isobutylene units and a different monomer. From the viewpoint of rubbery characteristics, the repeating units originating from isobutylene are contained preferably in an amount of 50% or more by weight, more preferably in an amount of 80% or more by weight, in particular preferably in an amount of 90 to 99%.

As the method for synthesizing the saturated hydrocarbon polymer, hitherto various polymerization methods have been reported. In recent years, in particular, a large number of, what is called, living polymerizations have been developed. In the case of a saturated hydrocarbon polymer, in particular, an isobutylene polymer, the following are known: the polymer can easily be produced by using inifer polymerization found out by Kennedy et al. (J. P. Kennedy et al., J. Polymer Sci., Polymer Chem. Ed. 1997, vol. 15, 2843); the polymer can be produced by polymerization, so as to have a molecular weight of about 500 to 100,000 and a molecular weight distribution of 1.5 or less; and various functional groups can be introduced into a terminal of the molecule.

The method for synthesizing the saturated hydrocarbon polymer having a reactive silicon group is described in, for example, JP-B-4-69659 and 7-108928, JP-A-63-254149, 64-22904 and 1-197509, Japanese Patent Official Gazette Nos. 2539445 and 2873395, JP-A-7-53882, and other publications. However, the method is not particularly limited thereto.

The above-mentioned saturated hydrocarbon polymers having a reactive silicon group may be used alone or in combination of two or more thereof.

The (meth)acrylic acid ester monomer which constitutes the main chain of the above-mentioned (meth)acrylic acid ester polymers is not particularly limited, and various monomers can be used. Examples thereof include (meth)acrylic acid based monomers such as (meth)acrylic acid, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, tolyl (meth) acrylate, benzyl(meth)acrylate, 2-methoxyethyl (meth)acrylate, 3-methoxybutyl (meth) acrylate, 2-hydroxyethyl (meth) acrylate, 2-hydroxypropyl (meth) acrylate, stearyl (meth) acrylate, glycidyl (meth)acrylate, γ-(methacryloyloxypropyl) trimethoxysilane, γ-(methacryloyloxypropyl) dimethoxymethylsilane, an ethylene oxide adduct of (meth) acrylic acid, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, perfluoroethyl (meth)acrylate, trifluoromethyl (meth)acrylate, bis(trifluoromethylmethyl) (meth)acrylate, 2-trifluoromethyl-2-perfluoroethylethyl (meth)acrylate, 2-perfluorohexylethyl (meth)acrylate, 2-perfluorodecylethyl (meth)acrylate, 2-perfuorohexadecylethyl (meth)acrylate and the like. In the (meth) acrylic acid ester polymers, any (meth)acrylic acid ester monomer may be copolymerized with a vinyl monomer, which will be described hereinafter. Examples of the vinyl monomer include styrene monomers such as styrene, vinyltoluene, α-methylstyrene, chlorostyrene, styrenesulfonic acid and salts thereof, and the like; fluorine-containing vinyl monomers such as perfluoroethylene, perfluoropropylene, fluorinated vinylidene and the like; silicon-containing vinyl monomers such as vinyltrimethoxysilane, vinyltriethoxysilane and the like; maleic anhydride, maleic acid, and monoalkyl esters and dialkyl esters of maleic acid; fumaric acid, monoalkyl ester and dialkyl ester of fumaric acid; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide, cyclohexylmaleimide and the like; nitrile-group-containing vinyl monomers such as acrylonitrile, methacrylonitrile and the like; amide-group-containing vinyl monomers such as acrylamide, methacrylamide and the like; vinyl esters such as vinyl acetate, vinyl propionate, vinyl pivalate, vinyl benzoate, vinyl cinnamate and the like; alkenes such as ethylene, propylene and the like; conjugated dienes such as butadiene, isoprene and the like; and vinyl chloride, vinylidene chloride, allyl chloride, allyl alcohol and the like. These may be used alone, or plural ones thereof may be copolymerized. Among them, a polymer made from a styrene monomer and a (meth)acrylic acid based monomer is preferred from the viewpoint of physical properties of the product, and others. More preferred is a (meth)acrylic polymer made from an acrylic acid ester monomer and a methacrylic acid ester monomer. Particularly preferred is an acrylic polymer made from an acrylic acid ester monomer. In articles for general buildings, a butyl acrylate based monomer is further preferred since the composition is required to have a low viscosity and the curd product is required to have a low modulus, a high elongation, weather resistance, heat resistance and other physical properties. On the other hand, in articles required to have oil resistance and others, for cars, a copolymer made mainly of ethyl acrylate is further preferred. This polymer made mainly of ethyl acrylate is excellent in oil resistance, but tends to be somewhat poor in low-temperature property (cold resistance); therefore, in order to improve the low-temperature property, ethyl acrylate is partially substituted with butyl acrylate. However, a good oil resistance is gradually damaged with an increase in the ratio of butyl acrylate. In articles required to have oil resistance, the ratio is preferably 40% or less, more preferably 30% or less. It is also preferred to use 2-methoxyethyl acrylate or 2-ethoxyethyl acrylate, wherein oxygen is introduced into an alkyl group of a side chain, in order to improve the low-temperature property and others without damaging the oil resistance. However, when the alkoxy group, which has an ether bond, is introduced to the side chain, a poor heat resistance tends to be exhibited; thus, when heat resistance is required, the ratio thereof is preferably 40% or less. The ratio is varied, considering oil resistance, heat resistance, low-temperature property and other physical properties necessary in accordance with usages or a requested purpose. In this way, an appropriate polymer can be obtained. An unrestricted example excellent in physical balances between oil resistance, heat resistance, low-temperature property and others is a copolymer of ethyl acrylate/butyl acrylate/2-methoxyethyl acrylate (ratio by weight: 40 to 50/20 to 30/30 to 20). In the present invention, a monomer out of these preferred monomers may be copolymerized with a different monomer, or may be block-copolymerized therewith. At this time, the preferred monomer is contained preferably at a ratio by weight of 40% or more. In the above-mentioned expressions, for example, (meth)acrylic acid represents acrylic acid and/or methacrylic acid.

The method for synthesizing such a (meth)acrylic acid ester polymer is not particularly limited, and may be a known method. However, the polymer obtained by an ordinary free-radical polymerization method using an azo compound, a peroxide or the like as a polymerization initiator has a problem that the value of the molecular weight distribution is generally as large as 2 or more, and the viscosity becomes high. Accordingly, it is preferred to use a living radical polymerization method in order to yield a (meth)acrylic acid ester polymer having a narrow molecular weight distribution and a low viscosity and containing, at a terminal of the molecule chain thereof, a crosslinkable functional group at a high content by percentage.

Out of variations of the "living radical polymerization method", the "atom transfer radical polymerization method" of polymerizing the (meth)acrylic acid ester monomer, using an organic halide, halogenated sulfonyl compounds or the like as an initiator and a transition metal complex as a catalyst, is more preferred as a method for producing a (meth)acrylic acid ester polymer having a specific functional group since the terminal has a halogen or the like, which is relatively advantageous for functional-group-converting reaction, and the flexibility in design of the initiator or the catalyst is large as well as the characteristics of the above-mentioned "living polymerization method" are exhibited. This atom transfer radical polymerization method is described in, for example, Matyjaszewski et al., J. Am. Chem. Soc., 1995, vol. 117, 5614.

As the method for producing the (meth)acrylic acid ester polymer having a reactive silicon group, a production process using a free radical polymerization method using a chain transfer agent is disclosed in, for example, JP-B-3-14068 and 4-55444, and JP-A-6-211922. JP-A-9-272714 and others disclose a production process using an atom transfer radical polymerization method. However, the method is not particularly limited thereto.

The above-mentioned (meth)acrylic acid ester polymers having a reactive silicon group may be used alone or in combination of two or more thereof.

These polymers having a reactive silicon group may used alone or in combination of two or more thereof. Specifically, it is allowable to use a polymer obtained by blending two or more selected from the group consisting of the polyoxyalkylene polymers having a reactive silicon group, the saturated hydrocarbon polymers having a reactive silicon group, and the (meth)acrylic acid ester polymers having a reactive silicon group.

The method for producing a polymer wherein a polyoxyalkylene polymer having a reactive silicon group is blended with a (meth)acrylic acid ester polymer having a reactive silicon group is suggested in JP-A-59-122541, 63-112642, 6-172631 and 11-116763, and other publications. However, the method is not particularly limited thereto. A preferred specific example thereof is a method of blending a polyoxyalkylene polymer having a reactive silicon group with a copolymer which has a reactive silicon group and has a molecular chain composed substantially of (meth)acrylic acid ester monomer units each having 1 to 8 carbon atoms and represented by the following general formula (9)

—CH$_2$—C(R$^{13}$)(COOR$^{14}$)—     (9)

(wherein R$^{13}$ represents a hydrogen atom or a methyl group, and R$^{14}$ represents an alkyl group having 1 to 8 carbon atoms), and (meth) acrylic acid ester monomer units each having an alkyl group having 10 or more carbon atoms and represented by the following general formula (10):

—CH$_2$—C(R$^{13}$)(COOR$^{15}$)—     (10)

(wherein R$^{13}$ has the same meaning as described above, and R$^{15}$ represents an alkyl group having 10 or more carbon atoms).

Examples of R$^{14}$ in the general formula (9) include alkyl groups having 1 to 8 carbon atoms, preferably 1 to 4 carbon atoms, more preferably 1 to 2 carbon atoms, such as a methyl, ethyl, propyl, n-butyl, t-butyl, and 2-ethylhexyl group. The alkyl groups as R$^{14}$ may be used alone or in the form of a mixture of two or more thereof.

Examples of R$^{15}$ in the general formula (10) include long-chain alkyl groups having 10 or more carbon atoms, usually 10 to 30 carbon atoms, preferably 10 to 20 carbon atoms, such as lauryl, tridecyl, cetyl, stearyl, and behenyl groups. The alkyl groups as R$^{15}$ may be used alone or in the form of a mixture of two or more thereof in the same manner as R$^{14}$.

The molecular chain of the (meth)acrylic acid ester copolymer is composed substantially of the monomer units of the formulae (9) and (10). The word "substantially" referred to herein means that the total amount of the monomer units of the formulae (9) and (10) present in the copolymer is over 50% by weight. The total amount of the monomer units of the formulae (9) and (10) is preferably 70% or more by weight.

The presence ratio by weight of the monomer units of the formula (9) to the monomer units of the formula (10) is preferably from 95/5 to 40/60, more preferably from 90/10 to 60/40.

Examples of a monomer unit which is different from the monomer units of the formulae (9) and (10) and may be contained in the copolymer include acrylic acids such as acrylic acid, methacrylic acid and the like; monomers containing an amide group, such as N-methylolacrylamide, N-methylolmethacrylamide and the like, those containing an epoxy group, such as glycidyl acrylate, glycidyl methacrylate and the like, and those containing a nitrogen-containing group, such as diethylaminoethyl acrylate, diethylaminoethyl methacrylate and the like; and other monomer units originating from acrylonitrile, styrene, α-methylstyrene, alkyl vinyl ether, vinyl chloride, vinyl acetate, vinyl propionate, ethylene, or the like.

A polymer wherein a saturated hydrocarbon polymer having a reactive silicon group is blended with a (meth)acrylic acid ester copolymer having a reactive silicon group is suggested in JP-A-1-168764 and 2000-186176, and other publications. However, the polymer is not limited thereto.

A different example of the method for producing a polymer containing, as a blend component, a (meth)acrylic acid ester copolymer having a reactive silicon functional group is a method of polymerizing a (meth)acrylic acid ester monomer in the presence of a polymer having a reactive silicon group. This production method is specifically disclosed in JP-A-59-78223, 59-168014, 60-228516 and 60-228517, and other publications. However, the method is not limited thereto.

On the other hand, the main chain skeleton of the polymer(s) may contain a different component such as a urethane bond component as long as the advantageous effects of the present invention are not largely damaged.

The urethane bond component is not particularly limited, and an example thereof is a group generated by reaction between an isocyanate group and an active hydrogen group (and the group may be referred to as an amide segment hereinafter).

The amide segment is represented by the following general formula (11):

—NR$^{16}$—C(=O)—     (11)

(wherein R$^{16}$ represents a hydrogen atom or a substituted or unsubstituted organic group).

Specific examples of the amide segment include a urethane group generated by reaction between an isocyanate group and a hydroxyl group; a urea group generated by reaction between an isocyanate group and an amino group; and a thiourethane group generated by reaction between an isocyanate group and a mercapto group, and the group. In the present invention, groups generated by causing the active hydrogen occurring in the urethane group, the urea group and the thiourethane group to react further with an isocyanate group are also contained in the category of the group of the formula (11).

An example of the method for producing a polymer having an amide segment and a reactive silicon group with industrial ease is a method of causing a polymer having an active-hydrogen-containing group as its terminal to react with an excessive amount of a polyisocyanate compound to prepare a polymer having an isocyanate group at its polyurethane main chain terminal, and subsequently or simultaneously causing a part or the whole of individuals of the isocyanate group to react with a U group of a silicon compound represented by the following general formula (12):

$$U-R^{17}-SiR^2_{3-g}Z_g \quad (12)$$

(wherein $R^2$, Z and g have the same meanings as described above, and $R^{17}$ is a bivalent organic group, more preferably a substituted or unsubstituted bivalent hydrocarbon group having 1 to 20 carbon atoms; and U is an active-hydrogen-containing group selected from hydroxyl, carboxyl, mercapto, and mono-substituted or unsubstituted amino groups), thereby producing the polymer. Examples of known polymer-producing methods related to this production method include methods disclosed in JP-B-46-12154 (U.S. Pat. No. 3,632, 557), JP-A-58-109529 (U.S. Pat. No. 4,374,237), JP-A-62-13430 (U.S. Pat. No. 4,645,816), JP-A-8-53528 (EP 0676403), JP-A-10-204144 (EP 0831108), JP-A-2003-508561 as Japanese Patent Application National Publication (U.S. Pat. No. 6,197,912), JP-A-6-211879 (U.S. Pat. No. 5,364,955), JP-A-10-53637 (U.S. Pat. No. 5,756,751), JP-A-11-100427, 2000-169544, 2000-169545 and 2002-212415, Japanese Patent No. 3313360, U.S. Pat. Nos. 4,067,844 and 3,711,445, and JP-A-2001-323040, and other publications.

Another example of the above-mentioned method is a method of causing a polymer having an active-hydrogen-containing group at its terminal to react with a reactive-silicon-group-containing isocyanate compound represented by the following general formula (13):

$$O=C=N-R^{17}-SiR^2_{3-g}Z_g \quad (13)$$

(wherein $R^2$, $R^{17}$, Z and g have the same meanings as described above), thereby producing the polymer. Examples of known polymer-producing methods related to this production method include methods disclosed in JP-A-11-279249 (U.S. Pat. No. 5,990,257), JP-A-2000-119365 (U.S. Pat. No. 6,046,270), JP-A-58-29818 (U.S. Pat. No. 4,345,053), JP-A-3-47825 (U.S. Pat. No. 5,068,304), JP-A-11-60724, 2002-155145and2002-249538, WO 03/018658, WO03/059981and other publications.

Examples of the polymer having an active-hydrogen-containing group at its terminal include oxyalkylene polymer having a hydroxyl group at its terminal (polyetherpolyol), polyacrylpolyol, polyesterpolyol, saturated hydrocarbon polymer having a hydroxyl group at its terminal (polyolefinpolyol), polythiol compounds, polyamine compounds, polyalkyleneimine, polysiloxane and the like. Among them, polyetherpolyol, polyacrylpolyol, polyolefinpolyol, and polysiloxane are preferred since the resultant polymer has a relatively high glass transition temperature and the resultant cured product has very good cold resistance. The polyetherpolyol is particularly preferred since the resultant polymer has a low viscosity to exhibit a good workability and the depth curability thereof is good. The polyacrylpolyol and the saturated hydrocarbon polymers are more preferred since the cured product of the resultant polymer has good weather resistance and heat resistance.

As the polyetherpolyol, polyetherpolyol that is produced by any method can be used. Preferred is polyetherpolyol having, at its terminal, a hydroxyl group the number of individuals of which is at least 0.7 per molecular terminal on the average of all the molecules. Specific examples thereof include oxyalkylene polymer produced by use of a conventional alkali metal catalyst; and oxyalkylene polymer produced by causing an initiator such as a polyhydroxy compound, which has at least two hydroxyl groups, to react with an alkylene oxide in the presence of a double metal cyanide complex or cesium.

Out of the above-mentioned polymerization methods, the polymerization method using a double metal cyanide complex is preferred since the method makes it possible to yield oxyalkylene polymer having a lower unsaturated degree, a narrow Mw/Mn, a lower viscosity, a high acid resistance and a high weather resistance.

The polyacrylpolyol may be a polyol having a skeleton of an alkyl (meth)acrylate (co)polymer and having in the molecule thereof a hydroxyl group. The method for synthesizing the polymer is preferably a living radical polymerization method since a polymer having a narrow molecular weight distribution and a low viscosity can be obtained. An atom transfer radical polymerization method is more preferred. It is also preferred to use a polymer based on the so-called SGO process, which is obtained by subjecting an alkyl acrylate ester monomer described in JP-A-2001-207157 to continuous bulk polymerization at high temperature and high pressure. A specific example thereof is a "UH-2000" manufactured by Toagosei Co., Ltd or the like.

Specific examples of the above-mentioned polyisocyanate compound include aromatic polyisocyanates such as toluene (tolylene)diisocyanate, diphenylmethane diisocyanate, xylylene diisocyanate and the like; and aliphatic polyisocyanates such as isophoronediisocyanate, and hexamethylenediisocyanate and the like.

The silicon compound of the general formula (12) is not particularly limited, and specific examples thereof include amino-group-containing silanes such as γ-aminopropyltrimethoxysilane, N-(β-aminoethyl)-γ-aminopropyltrimethoxysilane, γ-(N-phenyl)aminopropyltrimethoxysilane, N-ethylaminoisobutyltrimethoxysilane, N-cyclohexylaminomethyltriethoxysilane, N-cyclohexylaminomethyldiethoxymethylsilane, N-phenylaminomethyltrimethoxysilane and the like; hydroxy-group-containing silanes such as γ-hydroxypropyltrimethoxysilane and the like; and mercapto-group-containing silanes such as γ-mercaptopropyltrimethoxysilane and the like, and the like. As described in JP-A-6-211879 (U.S. Pat. No. 5,364,955), JP-A-10-53637 (U.S. Pat. No. 5,756,751), JP-A-10-204144 (EP 0831108), and JP-A-2000-169544and2000-169545, the following can also be used as the silicon compound of the general formula (12): Michael addition reactants made from a variety of α,β-unsaturated carbonyl compounds and an amino-group-containing silane; and Michael addition reactants made from a variety of (meth)acryloyl-group-containing silanes and an amino-group-containing compound.

The reactive-silicon-group-containing isocyanate compound of the general formula (13) is not particularly limited, and specific examples thereof include γ-trimethoxysilylpropylisocyanate, γ-triethoxysilylpropylisocyanate, γ-methyldimethoxysilylpropylisocyanate, γ-methyldiethoxysilylpropylisocyanate, trimethoxysilylmethylisocyanate, dimethoxymethylsilylmethylisocyante and the like. As described in JP-A-2000-119365 (U.S. Pat. No. 6,046,270), a compound obtained by causing a silicon compound of the general formula (12) to react with an excessive amount of the above-mentioned polyisocyanate compound can also be used as the reactive-silicon-group-containing isocyanate compound of the general formula (13).

When the amount of the amide segment in the main chain skeleton of the polymer(s) which is/are the component (A) in the present invention is large, the viscosity of the polymer tends to be high. After the storage of the polymer(s), the viscosity may also rise so that the workability of the resultant composition may lower. Accordingly, in order to obtain a composition having very good storage stability and workability, it is preferred that the amide segment is not substantially contained therein. On the other hand, the amide segment in the main chain skeleton of the component (A) tends to cause an improvement in the curability of the composition of the present invention. Accordingly, when the main chain skeleton of the component(s) (A) contains an amide segment, the number of individuals of the amide segment is preferably from 1 to 10, more preferably from 1.5 to 5, in particular preferably from 2 to 3 per molecule on the average. If the number is less than 1, the curability may be sufficient. If the number is more than 10, the polymer becomes highly viscous so that a composition poor in workability may be obtained.

Out of the polymers produced by use of the compound of the general formula (12) or (13) by any one of the above-mentioned methods, a polymer made of a compound wherein $R^{17}$ is —$CH_2$— tends to have a particularly good curability. However, the curability may not be controlled with ease since the reactivity is too high. Moreover, problems are caused about the workability, the storage stability and others. Accordingly, the content by percentage of the above-mentioned polymer in the polymer(s) of the component(s) (A) is preferably 20% or less, more preferably 10% or less. It is preferred that the content by percentage is substantially 0%.

In the present invention, as the silanol condensation catalyst of the component (B), an amine compound is used.

The amine compound in the present invention includes, in the category thereof, nitrogen-containing cyclic compounds such as pyridine and the like. Specific examples thereof include aliphatic primary amines such as methylamine, ethylamine, propylamine, isopropylmine, butylamine, amylamine, hexylamine, octylamine, 2-ethylhexylamine, nonylamine, decylamine, laurylamine, pentadecylamine, cetylamine, stearylamine, cyclohexylamine and the like; aliphatic secondary amides such as dimethylamine, diethylamine, dipropylamine, diisopropylamine, dibutylamine, diamylamine, dihexylamine, dioctylamine, di(2-ethylhexyl) amine, didecylamine, dilaurylamine, dicetylamine, distearylamine, methylstearylamine, ethylstearylamine, butylstearylamine and the like; aliphatic tertiary amines such as triamylamine, trihexylamine, trioctylamine and the like; aliphatic unsaturated amines such as triallylamine, oleylamine and the like; aromatic amines such as aniline, laurylaniline, stearylaniline, triphenylamine and the like; and heterocyclic amines such as pyridine, 2-aminopyridine, 2-(dimethylamino)pyridine, 4-(dimethylaminopyridine), 2-hydroxypyridine, imidazole, 2-ethyl-4-methylimidazole, morpholine, N-methylmorpholine, piperidine, 2-piperidinemethanol, 2-(2-piperidino)ethanol, piperidone, 1,8-diazabicyclo(5,4,0)undecene-7 (DBU), 1,5-diazabicyclo(4,3,0)nonene-5 (DBN), 1,4-diazabicyclo(2,2,2)octane (DABCO), aziridine and the like; and other amines such as monoethanolamine, diethanolamine, triethanolamine, 3-hydroxypropylamine, ethylenediamine, propylenediamine, hexamethylenediamine, N-methyl-1,3-propanediamine, N,N'-dimethyl-1,3-propanediamine, diethylenetriamine, triethylenetetramine, 2-(2-aminoethylamino)ethanol, benzylamine, 3-methoxypropylamine, 3-lauryloxypropylamine, 3-dimethylaminopropylamine, 3-diethylaminopropylamine, 3-butylaminopropylamine, 3-morpholinopropylamine, 2-(1-piperazinyl)ethylamine, xylylenediamine, guanidine, diphenylguanidine, 2,4,6-tris (dimethylaminomethyl) phenol and the like. The amine compound is not limited thereto.

Among them, 2-(dimethylamino)pyridine, 4-(dimethylamino) pyridine, 2-hydroxypyridine, imidazole, DBU, DBN, DABCO, and other heterocyclic compounds are preferred since they exhibit a high activity. DBU and DBN are more preferred.

Amine compounds exhibit basicity; an amine compound wherein the pKa value of the conjugate acid thereof is 11 or more is preferred since the catalyst activity is high. In particular, DBU or DBN is particularly preferred since the compound is a base wherein the pKa value of the conjugate acid is 12 or more so as to exhibit a high catalyst activity.

On the other hand, an amine compound represented by the following general formula (14) tends to exhibit a high curability:

$$R^{18}{}_hQR^{19}NHR^{20} \quad (14)$$

(wherein Q is one selected from O, N, S and P; when Q is O or S, h is 1 and when Q is N or P, h is 2; $R^{18}$s are each a hydrogen atom, or a substituted or unsubstituted hydrocarbon group having 1 to 20 carbon atoms; when the number of $R^{18}$s is two or more, $R^{18}$s may be the same or different; $R^{19}$ is a substituted or unsubstituted bivalent hydrocarbon group having 1 to 10 carbon atoms; and $R^{20}$ is a hydrogen atom or a methyl group). In particular, monoethanolamine, 3-hydroxypropylamine, ethylenediamine, N-methylethylenediamine, 1,3-propanediamine, N-methyl-1,3-propanediamine, N,N'-dimethyl-1,3-propanediamine, and diethylenetriamine can be preferably used.

As the amine compound of the component (B), an amino-group-containing silane coupling agent (hereinafter referred to as an aminosilane) can also be used in the present invention. The aminosilane is a compound having a group containing a silicon atom to which a hydrolyzable group is bonded (hereinafter referred to as a hydrolyzable silicon group), and a substituted or unsubstituted amino group. Examples of the substituent in the substituted amino group include alkyl, aralkyl and aryl groups. An example of the hydrolyzable silicon group may be a group wherein Z is a hydrolyzable group out of the groups represented by the general formula (1). Specific examples thereof are the groups which have been already exemplified as the hydrolyzable group. Methoxy and ethoxy groups are preferred from the viewpoint of the hydrolysis rate thereof. The number of individuals of the hydrolyzable group is preferably 2 or more, in particular preferably 3 or more. Specific examples thereof include γ-aminopropyltrimethoxysilane, γ-aminopropyltriethoxysilane, γ-aminopropyltriisopropoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-(2-aminoethyl)aminopropylmethyldiethoxysilane, γ-(2-aminoethyl)aminopropyltrisopropoxysilane, γ-(2-(2-aminoethyl)aminoethyl)aminopropyltrimethoxysilane, γ-(6-aminohexyl)aminopropyltrimethoxysilane, 3-(N-ethylamino)-2-methylpropyltrimethoxysilane, γ-ureidopropyltrimethoxysilane, γ-ureidopropyltriethoxysilane, N-phenyl-γ-aminopropyltrimethoxysilane, N-benzyl-γ-aminopropyltrimethoxysilane, N-vinylbenzyl-γ-aminopropyltriethoxysilane, N-cyclohexylaminomethyltriethoxysilane, N-cyclohexylaminomethyldiethoxymethylsilane, N-phenylaminomethyltrimethoxysialne, (2-aminoethyl)aminomethyltrimethoxysilane, N,N'-bis[3-(trimethoxysilyl)propyl]ethylenediamine and the like.

As the aminosilane of the component (B), an aminosilane having an amino group (—$NH_2$) is preferred from the viewpoint of curability. From the viewpoint of availability, preferred are γ-aminopropyltrimethoxysilane, γ-aminopropyltriethoxysilane, γ-aminopropylmethyldimethoxysilane, and γ-(2-aminoethyl)aminopropyltrimethoxysilane.

A ketimine which is hydrolyzed to generate the above-mentioned amine compound can also be used as the component (B) in the present invention.

About the amine compound (B), only one species thereof may be used or two or more species thereof may be used together.

The use amount of the amine compound, which is a silanol catalyst of the component (B), is preferably from about 0.001 to 20 parts by weight, more preferably from about 0.1 to 10 parts by weight for 100 parts by weight of the component (A).

If the blend amount of the component (B) is below this range, the curing speed may become slow and the catalyst activity may fall after the composition is stored. On the other hand, if the blend amount of the component (B) is over this range, working life becomes too short so that the workability may deteriorate.

As the component (C) in the present invention, a silicon compound can be used which has, as substituents on its silicon, at least one electron withdrawing group and at least one group selected from alkoxy, alkenyloxy, acyloxy and hydroxyl groups.

When the silicon compound of the component (C) is used together with the amine compound (B), which is a silanol catalyst, the curing speed of the resultant curable composition can be made high.

The component (C) is a silicon compound which has, as substituents on its silicon, at least one electron withdrawing group and at least one group selected from alkoxy, alkenyloxy, acyloxy and hydroxyl groups.

When a typical example of such a compound is represented by a chemical formula, it can be represented by the following general formula (2):

$$R^3_{4-c-d}Y_c SiX_d \qquad (2)$$

(wherein $R^3$ is a substituted or unsubstituted hydrocarbon group having 1 to 20 carbon atoms, or a triorganosiloxy group represented by $(R'')_3 SiO$— (wherein R''s are each independently a substituted or unsubstituted hydrocarbon group having 1 to 20 carbon atoms), Ys each independently represent a group selected from a hydroxyl group, alkoxy groups, alkenyloxy groups, and acyloxy groups, Y is an electron withdrawing group, c is 1, 2, or 3, and d is 1, 2, or 3 provided that c+d is 4 or less).

The electron withdrawing group referred to herein is a group which makes the density of electrons on a Si atom lower than any unsubstituted hydrocarbon group (for example, methyl, ethyl or phenyl group) as reference when the group is bonded to the Si. Specific examples thereof include halogen atoms, acyl groups, alkoxycarbonyl groups, a nitro group, a cyano group, and a sulfonyl group; groups containing one or more of these groups; and hydrocarbon groups wherein the carbon atom at the α or β position of the silicon is bonded to oxygen, nitrogen or sulfur.

In other words, examples of the electron withdrawing group of the component (C) include halogens, electron withdrawing alkyl groups, electron withdrawing aryl groups, acyl groups, alkoxycarbonyl groups, a nitro group, a cyano group, a sulfonyl group and the like.

The electron withdrawing alkyl groups are typically represented by the following general formula (3):

$$-(CR^4_2)_m-CR^5_{3-e}W_e \qquad (3)$$

(wherein $R^4$s, the number of which is 2×m, are each independently a hydrogen atom or a hydrocarbon group having 1 to 20 carbon atoms, $R^5$s are each a hydrogen atom or a hydrocarbon group having 1 to 20 carbon atoms, W is a group selected from perfluoroalkyl groups having 1 to 20 carbon atoms, a cyano group, halogens, —$OR^6$, —$NR^7R^8$, —N=$R^9$ and —$SR^{10}$ (wherein $R^6$, $R^7$, $R^8$ and $R^{10}$ are each a hydrogen atom, or a substituted or unsubstituted hydrocarbon group having 1 to 20 carbon atoms, and $R^9$ is a bivalent substituted or unsubstituted hydrocarbon group having 1 to 20 carbon atoms), e is 1, 2, or 3, and m is 0 or 1). Specific examples thereof include trifluoromethyl, chloromethyl, dichloromethyl, bromomethyl, pentafluoroethyl, pentafluoroalkyl, trifluoromethylmethyl, 2-trifluoromethylethyl, 2-perfluoroalkylethyl, cyanoethyl, 1-chloroethyl, 2-chloroethyl, bromoethyl, acetoxymethyl, aminomethyl, dimethylaminomethyl, diethylaminomethyl, (2-aminoethyl)aminomethyl, 2-morpholinoethyl, piperidinomethyl, piperidinomethyl, 2-piperidinoethyl, isocyanatomethyl, mercaptomethyl groups and the like.

The electron withdrawing aryl groups are typically represented by the following general formula (4):

$$-(Ar)V_f \qquad (4)$$

(wherein Ar represents an aromatic ring, and V is a group which a hydrogen atom on the aromatic ring is substituted with, and which is a group selected from halogens, acyl groups, alkoxycarbonyl groups, a nitro group, a cyano group, a sulfonyl group, and perfluoroalkyl groups, and f is 1 or more and is a number of hydrogen atoms on the aromatic ring which are able to be substituted). Examples of the aromatic ring include benzene, naphthalene, furan, pyridine rings and other rings. The aromatic ring is not particularly limited, and is preferably a group originating from a benzene ring from the viewpoint of the effect thereof as an electron withdrawing aryl group, and the availability thereof. Specific examples thereof include fluorophenyl, difluorophenyl, trifluorophenyl, pentafluorophenyl, 4-(trifluoromethyl)-2,3,5,6-tetrafluorophenyl, chlorophenyl, dichlorophenyl, trichlorophenyl, bromophenyl, acetoxyphenyl, (ethoxycarbonyl)phenyl, nitrophenyl, nitrilophenyl, methylsulfonylphenyl, trifluoromethylphenyl groups, and other groups.

As the electron withdrawing group of the component (C), preferred are fluorine, and chloromethyl, dichloromethyl, 2-trifluoromethylethyl, 2-perfluoroalkylethyl, cyanoethyl, acetoxymethyl, dimethylaminomethyl, diethylaminomethyl, (2-aminoethyl) aminomethyl, isocyanatomethyl, mercaptomethyl, trifluorophenyl, pentafluorophenyl, trichlorophenyl groups, and other groups since the component (C) can have a higher curability-improving effect. More preferred are fluorine, and chloromethyl, dichloromethyl, 2-trifluoromethylethyl, acetoxymethyl, mercaptomethyl and pentafluorophenyl groups. Particularly preferred are fluorine and a pentafluorophenyl group, and most preferred is fluorine.

On the other hand, examples of Y in the general formula (2) include hydroxyl, alkoxy, alkenyloxy, acyloxy groups, and other groups. From the viewpoint of availability, alkoxy, and acyloxy groups are preferred, and alkoxy groups are more preferably preferred. Ethoxy and methoxy groups are preferred and a methoxy group is most preferred since the curability-improving effect thereof is high.

The molecular weight of the silicon compound of the component (C) is preferably 3,000 or less, more preferably 1,000 or less. If the molecular weight is over this range, the advantageous effects of the present invention may not be obtained with ease. Moreover, the addition amount necessary for obtaining sufficient advantageous effects tends to increase. Thus, an economical disadvantage may be produced.

As the silicon compound of the component (C), preferred from the viewpoint of availability are chloromethyltrimethoxysilane, chloromethyldimethoxymethylsilane, dichloromethyldimethoxymethylsilane, bis(chloromethyl)dimethoxysialne, 2-chloroethyltrimethoxysilane, 3,3,3-trifluoropropyltrimethoxysilane, 3,3,3-trifluoropropyldimethoxysilane, perfluoroalkylethyltrimethoxysilane, bis(N-methylbenzamide)ethoxymethylsilane, 2-cyanoethyltrimethoxysilane, acetoxymethyltriethoxysilane, diethylaminomethyltriethoxysilane, (2-aminoethyl)aminomethyltrimethoxysilane, isocyanatomethyltrimethoxysilane, methyl-N-(trimethoxymethyl)carbamate, chlorophenyltriethoxysilane, bis(pentafluorophenyl)dimethoxysilane, 4-trifluoromethyl-2,3,5,6-tetrafluorophenyltriethoxysilane, and fluorotriethoxysilane. Since a higher curability-improving effect can be expected, preferred are chloromethyltrimethoxysilane, chloromethyldimethoxymethylsilane, trifluoropropyldimethoxymethylsilane, acetoxymethyltriethoxysilane, bis(pentafluorophenyl)dimethoxysilane, and fluorotriethoxysilane. Particularly preferred are bis(pentafluorophenyl)dimethoxysilane and fluorotriethoxysialne, and most preferred is fluorotriethoxysialne.

As the component (C), there can be used a self-condensed product wherein the silicon compound of the component (C) is partially condensed, or a partially-condensed product composed of the silicon compound of the component (C) and a hydrolyzable-group-containing silicon compound other than the component (C). Specific examples of the hydrolyzable-group-containing silicon compound other than the component (C) include a silane coupling agent which will be described later, and a silicon compound used as silicate.

The use amount of the silicon compound of the component (C) is preferably from about 0.001 to 20 parts by weight, more preferably from about 0.01 to 10 parts by weight, in particular preferably from about 0.01 to 5 parts by weight for 100 parts by weight of the component(s) (A). If the blend amount of the component (C) is below this range, the curability-improving effect, which is one of the advantageous effects of the present invention, may not be sufficiently obtained. On the other hand, if the blend amount of the component (C) is over this range, working life becomes too short so that the workability may deteriorate. Moreover, an economical disadvantage is also produced.

A silane coupling agent can be used as an adhesion-imparting agent in the curable composition of the present invention. The silane coupling agent referred to herein is a compound having, in the molecule thereof, a hydrolyzable silicon group and a functional group other than the silicon group. The agent exhibits a remarkable adhesiveness improving effect under a non-primer condition or primer-treatment condition when the agent is applied to a variety of substrates, that is, inorganic substrates/such as glass, aluminum, stainless steel, zinc, copper, mortar and the like, and organic substrates such as vinyl chloride, acrylic resin, polyester, polyethylene, polypropylene, polycarbonate and the like. When the agent is used under a non-primer condition, the effect of improving the adhesiveness onto the various adhesion-receiving bodies is particularly remarkable. Besides, the silane coupling agent is a compound which can function as a physical property adjustor, an agent for improving the dispersibility of an inorganic filler, or some other agents.

An example of the hydrolyzable silicon group of the silane coupling agent is a group wherein Z is a hydrolyzable group out of the groups represented by the general formula (1). Specific examples thereof include the groups already exemplified as a hydrolyzable group. Methoxy and ethoxy groups are preferred from the viewpoint of the hydrolysis rate thereof. The silane coupling agent preferably has two or more hydrolyzable groups, and in particular preferably has three or more hydrolyzable groups.

Examples of the functional group other than the hydrolyzable silicon group include substituted or unsubstituted amino, mercapto, carboxyl, vinyl, and isocyanate groups, isocyanurate, halogens and others. Among them, substituted or unsubstituted amino and isocyanate groups, and isocyanurate are preferred since they have a high adhesiveness improving effect. The amino groups are particularly preferred.

A silane coupling agent having both of a hydrolyzable silicon group and an amino group is generally called an aminosialne. In the present invention, the aminosilane functions as the component (B) also, that is, a silanol condensation catalyst. Thus, in the present specification, specific examples of the aminosilane are given in the description on the component (B).

When the function as the adhesion-imparting agent is more exhibited, the aminosilane may be used in an amount larger than the amount necessary as the silanol condensation catalyst.

Specific examples of the silane coupling agent other than aminosilanes include isocyanate silanes such as γ-isocyanate propyltrimethoxysilane, γ-isocyanate propyltriethoxysilane, γ-isocyanate propylmethyldiethoxysilane, γ-isocyanate propylmethyldimethoxysilane, (isocyanatemethyl) trimethoxysilane, (isocyanatemethyl) dimethoxymethylsilane and the like; ketimine type silanes such as N-(1,3-dimethylbutylidene)-3-(triethoxysilyl)-1-propaneamie and the like; mercaptosilanes such as γ-mercaptopropyltrimethoxysilane, γ-mercaptopropyltriethoxysilane, γ-mercaptopropylmethyldimethoxysilane, γ-mercaptopropylmethyldiethoxysilane, mercaptomethyltriethoxysilane and the like; carboxysialnes such as β-carboxyethyltriethoxysilane, β-carboxyethylphenylbis(2-methoxyethoxy)silane, N-β-(carboxymethyl)aminoethyl-γ-aminopropyltrimethoxysilane and the like; vinyl-type-unsaturated-group-containing silanes such as vinyltrimethoxysilane, vinyltriethoxysilane, γ-methacryloyloxypropylmethyldimethoxysilane, γ-acryloyloxypropyltriethoxysilane and the like; halogen-containing silanes such as γ-chloropropyltrimethoxysilane and the like; and isocyanurate silanes such as tris (3-trimethoxysilylpropyl) isocyanurate and the like, and the like. A reactant of an aminosilane and an isocyanate silane as described above, a reactant of an aminosilane and a (meth)acryloyloxy-group-containing silane, or the like can also be used. Condensation products obtained by condensing the above-mentioned silanes partially can also be used. Furthermore, derivatives obtained by modifying these can also be used as the silane coupling agent, examples of the derivatives including amino-modified silyl polymers, silylated aminopolymers, unsaturated aminosilane complexes, phenylamino long-chain alkylsilanes, aminosililated silicones, and silylated polyesters.

The silane coupling agents may be used alone or in the form of a mixture of two or more thereof.

The use amount used in the present invention is preferably from about 0.01 to 20 parts by weight, more preferably from about 0.1 to 10 parts by weight, even more preferably from about 1 to 7 parts by weight for 100 parts by weight of the component (A). If the blend amount is below this range, a sufficient adhesiveness may not be obtained. If the blend amount of the component (C) is over this range, a practical curing speed tends not to be obtained. Moreover, the curing reaction may not sufficiently advance with ease.

As the adhesion-imparting agent, which is not particularly limited, the following can be used besides the above-mentioned silane coupling agent: for example, an epoxy resin, a phenol resin, sulfur, an alkyl titanate, an aromatic polyisocyanate and others. The adhesion-imparting agent may be used alone or in the form of a mixture of two or more thereof.

In the present invention, a different curing catalyst may be used together to such a degree that the advantageous effects of the present invention are not lowered.

Specific examples include carboxylic acids such as acetic acid, propionic acid, butyric acid, 2-ethylhexanoic acid, lauric acid, stearic acid, oleic acid, linoleic acid, pivalic acid, 2,2-dimethylbutyric acid, 2,2-diethylbutyric acid, 2,2-dimethylhexanoic acid, 2,2-diethylhexanoic acid, 2,2-dimethyloctanoic acid, 2-ethyl-2,5-dimethylhexanoic acid, neodecanoic acid, versatic acid and other acids; derivatives of the carboxylic acids (carboxylic anhydrides, esters, amides, nitriles and acyl chlorides); carboxylic acid metal salts such as tin carboxylate, lead carboxylate, bismuth carboxylate, potassium carboxylate, calcium carboxylate, barium carboxylate, titanium carboxylate, zirconium carboxylate, hafnium carboxylate, vanadium carboxylate, manganese carboxylate, iron carboxylate, cobalt carboxylate, nickel carboxylate, cerium carboxylate and other carboxylates; titanium compounds such as tetrabutyl titanate, tetrapropyl titanate, titanium tetrakis(acetylacetonate), bis(acetylacetonate)diisopropoxytitanium, diisopropoxytitanium bis(ethylacetonate) and other titanates; organic tin compounds such as dibutyltin dilaurate, dibutyltin maleate, dibutyltin phthalate, dibutyltin dioctanoate, dibutyltin bis(2-ethylhexanoate), dibutyltin bis(methylmaleate), dibutyltin bis(ethylmaleate), dibutyltin bis(butylmaleate), dibutyltin bis(octylmaleate), dibutyltin bis(tridecylmaleate), dibutyltin bis(benzylmaleate), dibutyltindiacetate, dioctyltinbis(ethylmaleate), dioctyltin bis(octylmaleate), dibutyltin dimethoxide, dibutyltin bis (nonylphenoxide), dibutenyltin oxide, dibutyltin oxide, dibutyltin bis(acetylacetonate), dibutyltin bis(ethylacetoacetonate), a reactant of dibutyltin oxide and a silicate compound, and a reactant of dibutyltin oxide and a phthalic acid ester and other tin compounds; aluminum compounds such as aluminum tris(acetylacetonate), aluminum tris(ethylacetoacetate), and diisopropoxyaluminum methylacetoacetate and other aluminum compounds; zirconium compounds such as zirconium tetrakis(acetylacetonate) and the like; various metal alkoxides such as tetrabutoxyhafnium and the like; organic acidic phosphates; organic sulfonic acids such as trifluoromethanesulfonic acid and the like; and inorganic acids such as hydrochloric acid, phosphoric acid, boronic acid and other acids. When any one of these curing catalysts is used together, the catalyst activity becomes high and an improvement is expected in depth curability, thin-layer curability, adhesiveness, and others. However, if the amount of the added carboxylic acid is large, a sufficient adhesiveness may not be obtained. Moreover, in accordance with the added amount thereof, the organic tin compound degrades the recovery property, the durability and the creep resistance of the cured product of the resultant curable composition.

A filler can be added to the composition of the present invention. Examples of the filler include reinfoced fillers such as fumed silica, precipitated silica, crystalline silica, fused silica, dolomite, silicic anhydride, hydrated silicic acid, and carbon black and the like; ground calcium carbonate, colloidal calcium carbonate, magnesium carbonate, diatomaceous earth, calcined clay, clay, talc, titanium oxide, bentonite, organic bentonite, ferric oxide, aluminum fine powder, flint powder, zinc oxide, active zinc white, shirasu balloon, glass micro-balloon, organic micro-balloon made of phenol resin or vinylidene chloride resin, PVC powder, PMMA powder, and other resin powders; and fibrous fillers such as asbestos, glass fiber, and filament and the like. When the filler is used, the use amount thereof is from 1 to 250 parts by weight, preferably from 10 to 200 parts by weight for 100 parts by weight of the polymer(s) of the component(s) (A).

As described in JP-A-2001-181532, the filler can be dehydrated and dried in advance by mixing the filler with a dehydrating agent such as calcium oxide and the like into a homogeneous form, putting the mixture air-tightly into a bag made of an airtight material, and then allowing the bag to stand still for an appropriate time. By use of this filler, which has a low water content, the storage stability of the composition can be improved, in particular, when the composition is rendered a one-component composition.

When a composition having a high transparency is obtained, there can be used, as a filler, polymer powder made of a polymer such as methyl methacrylate and the like, amorphous silica, or the like, as described in JP-A-11-302527. Moreover, a composition having a high transparency can be obtained by using, as a filler, hydrophobic silica, which silicon dioxide fine powder is having a surface to which hydrophobic groups are bonded, as described in JP-A-2000-38560. The surface of the silicon dioxide fine powder generally has silanol groups (—SiOH), and the silanol groups are caused to react with an organic silicon halide, an alcohol or the like, thereby producing hydrophobic group (—SiO—). The resultant product is hydrophobic silica. Specifically, dimethylsiloxane, hexamethyldisilazane, dimethyldichlorosilane, trimethoxyoctylsilane, trimethylsilane or the like is caused to react with and is bonded to the silanol groups present in the surface of the silicon dioxide fine powder. The resultant is hydrophobic silica. Silicon dioxide fine powder having a surface made of silanol groups (—SiOH) is called hydrophilic silica fine powder.

When a cured product having a high strength is desired to be obtained by the use of the filler, the filler is preferably a filler selected from fumed silica, precipitated silica, crystalline silica, fused silica, dolomite, silicic anhydride, hydrated silicic acid, carbon black, surface-treated fine calcium carbonate, calcined clay, clay, active zinc white, and others. When the filler is used in an amount of 1 to 200 parts by weight for 100 parts by weight of the polymer(s) (A) having a reactive silicon group, a preferred result can be obtained. Further, in the case that a cured product having a low strength and a large elongation at break is desired to be obtained, a preferred result can be obtained when a filler selected from titanium oxide, a calcium carbonate species such as ground calcium carbonate, magnesium carbonate, talc, ferric oxide, zinc oxide, shirasu balloon, and others is used in an amount of 5 to 200 parts by weight for 100 parts by weight of the polymer(s) (A) having a reactive silicon group. As the value of the specific surface area of calcium carbonate is larger, the effect of improving the strength at break, the elongation at break and the adhesiveness of the cured product becomes larger. Of course, these fillers may be used alone or in the form of a mixture of two or more thereof. When calcium carbonate is used, it is desired to use surface-treated fine calcium carbonate, and a calcium carbonate species having a large particle diameter, such as ground calcium carbonate and the like, together. The particle diameter of the surface-treated fine calcium carbonate is preferably 0.5µm or less, and the surface treatment is preferably treatment with a fatty acid or a fatty acid salt. Moreover, the particle diameter of the calcium carbonate species having a large particle diameter is preferably 1 µm or more, and the species not subjected to any surface treatment can be used.

In order to improve the workability (such as anti-sagging) of the composition or make the surface of the cured product mat, it is preferred to add an organic balloon or inorganic balloon thereto. The filler may be subjected to surface treatment. Only one species thereof may be used, or two or more species thereof may be used in a mixture form. To improve the workability (such as anti-sagging), the particle diameter of the balloons is preferably 0.1 mm or less. To make the cured product surface mat, the diameter is preferably from 5 to 300 µm.

The composition of the present invention can be preferably used for: a joint of outer walls of a building, such as siding boards, in particular, ceramic siding boards and others; an adhesive agent for outer wall tiles; an adhesive agent, for outer wall tiles, that may remain as it is in the joint of the walls; or the like since the cured product therefrom has good chemical resistance and other properties. It is desired that the design of outer walls is in harmony with the design of the sealing compound. The composition is used for high-quality outer walls when sputtering paint is used together or colored aggregate is incorporated into the composition. When a scaly or granular substance having a diameter of about 0.1 mm or more, preferably about 0.1 to 5.0 mm is blended with the composition of the present invention, the cured product is in harmony with high-quality outer walls and the external appearance of the cured product is maintained over a long term since the cured product is excellent in chemical resistance. When the granular substance is used, the surface becomes a sandy surface with a scattered sand tone or a sandstone tone. When the scaly substance is used, the surface becomes an uneven surface based on the scales.

As described in JP-A-9-53063, a diameter, a blend amount, a material and other factors preferred for the granular substance are as follows:

The diameter is about 0.1 mm or more, preferably from about 0.1 to 5.0 mm. In accordance with the material or pattern of outer walls, and others, the substance which has an appropriate size can be used. The substance which has a size of about 0.2 to 5.0 mm, or about from 0.5 to 5.0 mm can also be used. In the case of the scaly substance, the thickness is made as small (about 0.01 to 1.00 mm) as about $1/10$ to $1/5$ of the diameter. The scaly or granular substance is beforehand incorporated into the sealing base compound, and the resultant is carried as a sealing compound to a construction site, or when the substance is used, the substance is incorporated into the sealing base compound in a construction site.

The scaly or granular substance is blended in an amount of about 1 to 200 parts by weight for 100 parts by weight of the composition such as a sealing compound or an adhesive. The blend amount is appropriately selected in accordance with the size of individual pieces or grains of the scaly or granular substance, the material or the pattern of outer walls, and others.

As the scaly or granular substance, there is used a natural material such as silica sand, mica and the like, synthetic rubber, synthetic resin, and an inorganic material such as alumina and the like. In order to make the designability thereof high when it is filled into a joint portion, the substance is colored into an appropriate color in accordance with the material or the pattern of outer walls, and others.

A preferred finishing method and so on are described in JP-A-9-53063.

When a balloon (preferably having an particle diameter of 0.1 mm or more) is used for a similar purpose, the cured product has a sandy surface with a scattered sand tone or a sandstone tone and further the cured product can be made light. As described in JP-A-10-251618, a diameter, a blend amount, a material and other factors preferred for the balloon are as follows:

The balloon is a spherical filler the inside of which is hollow. Examples of the material of this balloon include inorganic materials such as glass, shirasu, silica and the like, and organic materials such as phenol resin, urea resin, polystyrene, saran and the like. However, the material is not limited only thereto. An inorganic material and an organic material can be compounded, or the materials are laminated to form a multilayer. A balloon made of an inorganic material, an organic material, or a material wherein these are compounded can be used. Further, a single balloon or a mixture wherein different balloons are mixed may be used. Furthermore, the balloon that can be used may be a balloon having a worked or coated surface or a balloon having a surface treated with a variety of surface treating agents. For example, an organic balloon may be coated with calcium carbonate, talc, titanium oxide, or the like, or an inorganic balloon may be surface-treated with a silane coupling agent.

In order to obtain a sandy surface with a scattered sand tone or a sandstone tone, the granular diameter of the balloon is preferably 0.1 mm or more. A balloon having a granular diameter of about 0.2 to 5.0 mm or about 0.5 to 5.0 mm can also be used. If the diameter is less than 0.1 mm, only the viscosity of the composition is raised but a sandy feeling may not be exhibited even if a large amount of the balloon is blended with the other components. The blend amount of the balloon can easily be decided in accordance with the degree of a desired sandy feeling with a scattered sand tone or sandstone tone. Usually, it is desired to blend a balloon having a granular diameter of 0.1 mm or more at a volume concentration of 5 to 25% by volume of the composition. If the volume concentration of the balloon is less than 5% by volume, no sandy feeling is obtained. If the concentration is more than 25% by volume, the viscosity of the sealing compound or adhesive becomes high so that the workability deteriorates. Moreover, the modulus of the cured product also becomes high. Thus, basic performances of the sealing compound or adhesive tend to be damaged. For the balance between the feeling and basic performances of the sealing compound, a particularly preferred volume concentration is from 8 to 22% by volume.

When the balloon is used, the following can be added: a slip inhibitor as described in JP-A-2000-154368, or an amine compound for changing the surface of the curd product into an uneven state to make the surface mat, in particular, a primary amine and/or a secondary amine having a melting point of 35° C. or higher, as described in JP-A-2001-164237.

Specific examples of the balloon are described in JP-A-2-129262, 4-8788, 4-173867, 5-1225, 7-113073, 9-53063, 10-251618, 2000-154368 and 2001-164237, WO 97/05201, and other publications.

A thermally expandable fine hollow body can be used, which is described in JP-A-2004-51701 and 2004-66749, and other publications. The thermally expandable fine hollow body is a plastic sphere body wherein a low boiling point compound, such as a hydrocarbon having 1 to 5 carbon atoms, is wrapped into a sphere form with a polymeric outer shell material (such as vinylidene chloride copolymer, acrylonitrile copolymer, or vinylidene chloride-acrylonitrile copolymer). When an adhesion portion wherein the present composition is used is heated, the pressure of gas in the shell of the thermally expandable fine hollow body increases so that the polymeric outer shell material becomes soft. In this way, the volume expands abruptly so that the hollow body fulfils a function of peeling off the adhesion interface. The addition of the thermally expandable fine hollow body makes it possible to yield an adhesive composition which can be peeled off without breaking any material only by heating when unnecessary and can further be peeled off by heating without using any organic solvent.

When the composition of the present invention contains sealing compound cured particles, it is possible as well to make irregularities in the surface and improve the designability. As described in JP-A-2001-115142, a diameter, a blend amount, a material and others preferred for the sealing compound cured particles are as follows: The diameter is preferably from about 0.1 to 1 mm, more preferably from about 0.2 to 0.5 mm. The blend amount in the curable composition is preferably from 5 to 100% by weight, more preferably from 20 to 50% by weight of the composition. Examples of the material include urethane resin, silicone, modified silicone, polysulfide rubber and the like. The material is not limited as long as the material is a material used for sealing compounds. A modified silicone based sealing compound is preferred.

Moreover, a silicate can be used in the composition of the present invention. This silicate acts as a crosslinking agent, and has a function of improving the recovery property, the durability and the creep resistance of the polymer(s) of the component (A) in the present invention. Furthermore, the silicate also has a function of improving the adhesiveness, the water-resistant adhesiveness, and the adhesion durability under high temperature and high humidity. As the silicate, tetraalkoxysilane or a partially-hydrolyzed condensation product thereof can be used. In the case of using the silicate, the use amount thereof is preferably from 0.1 to 20 parts by weight, more preferably from 0.5 to 10 parts by weight for 100 parts by weight of the polymer(s) of the component (A).

Specific examples of the silicate include tetraalkoxysilanes (tetraalkylsilicates) such as tetramethoxysilane, tetraethoxysilane, ethoxytrimethoxysilane, dimethoxydiethoxysilane, methoxytriethoxysilane, tetra-n-propoxysilane, tetra-i-propoxysilane, tetra-n-butoxysilane, tetra-i-butoxysilane, tetra-t-butoxysilane and the like; and partially-hydrolyzed condensation products thereof.

The partially-hydrolyzed condensation products of tetraalkoxysilanes are more preferred since their effects of improving the recovery property, the durability e and the creep resistance in the present invention are larger than those of tetraalkoxysilanes.

Examples of the partially-hydrolyzed condensation products of tetraalkoxysilanes include products each obtained by adding water to a tetraalkoxysilane in a usual way, and then hydrolyzing the resultant partially so as to be condensed. Furthermore, as partially-hydrolyzed condensation products of organosilicate compounds, commercially available products can be used. Examples of the condensation products include Methyl Silicate 51 and Ethyl Silicate 40 (each manufactured by Colcoat Co., Ltd.), and the like.

A plasticizer can be added to the composition of the present invention. The addition of the plasticizer makes it possible to adjust the viscosity and the slump property of the curable composition, and the tensile strength, the elongation and other mechanical properties of the cured product obtained by curing the composition. Examples of the plasticizer include phthalic acid esters such as dibutyl phthalate, diheptyl phthalate, bis(2-ethylhexyl) phthalate, butylbenzyl phthalate and the like; non-aromatic dibasic acid esters such as dioctyl adipate, dioctyl sebacate, dibutyl sebacate, isodecyl succinate and the like; aliphatic esters such as butyl oleate, methyl acetylricinolate and the like; phosphates such as tricresyl phosphate, tributyl phosphate and the like; trimellitic acid esters; chlorinated paraffins; hydrocarbon oils such as alkyldiphenyl, partially-hydrogenated terphenyl and the like; process oils; epoxy plasticizers such as epoxidized soybean oil, benzyl epoxystearate and the like.

A polymeric plasticizer can be used. In the case of using the polymeric plasticizer, the initial physical properties are maintained over a longer term than in the case of using a low molecular weight plasticizer, which does not contain in the molecule thereof any polymeric component. Furthermore, when an alkyd paint is painted onto the cured product, the drying property, which may be called paintability, can be improved. Specific examples of the polymeric plasticizer include vinyl polymers, which are each obtained by polymerizing a vinyl monomer by a variety of methods; polyalkylene glycol esters such as diethylene glycol dibenzoate, triethylene glycol dibenzoate, pentaerythritol esters and the like; polyester plasticizers each made from a dibasic acid such as sebacic acid, adipic acid, azelaic acid, phthalic acid or the like, and a dihydric alcohol such as ethylene glycol, diethylene glycol, triethylene glycol, propylene glycol, dipropylene glycol or the like; polyethers, for example, polyetherpolyols such as polyethylene glycol, polypropylene glycol polytetraethylene glycol or the like, which has a molecular weight of 500 or more, preferably 1000 or more, and derivatives obtained by changing hydroxyl groups of these polyetherpolyols to ester groups, ether groups, or the like, and the like; polystyrenes such as polystyrene, and poly-α-methylstyrene, and the like; and polybutadiene, polybutene, polyisobutylene, butadiene-acrylonitrile, and polychloroprene and the like. However, the polymeric plasticizer is not limited thereto.

Out of these polymeric plasticizers, ones compatible with the component (A) are preferred. From this viewpoint, polyethers and vinyl polymers are preferred. When a polyether is used as the plasticizer, the surface curability and the depth curability are improved. Moreover, after the composition is stored, the composition does not undergo curing delay. Thus, the use is preferred. Out of the plasticizers, polypropylene glycol is more preferred. From the viewpoint of compatibility, weather resistance and heat resistance, vinyl polymers are preferred. Out of the vinyl polymers, acrylic polymers and/or methacrylic polymers are preferred, and acrylic polymers such as poly(alkyl acrylate)s are more preferred. The method for synthesizing the polymers is preferably a living radical polymerization method since the molecular weight distribution is narrow and the viscosity is low. An atomic transfer radical polymerization method is more preferred. It is also preferred to use a polymer based on the so-called SGO process, which is obtained by subjecting an alkyl acrylate monomer described in JP-A-2001-207157 to continuous bulk polymerization at high temperature and high pressure.

The number-average molecular weight of the polymeric plasticizer is preferably from 500 to 15,000, more preferably from 800 to 10,000, even more preferably from 1000 to 8,000, in particular preferably from 1,000 to 5,000. The molecular weight is most preferably from 1,000 to 3,000. If the molecular weight is too low, the plasticizer flows out with time by heat or rainfall so that the initial physical properties cannot be maintained over a long term, the plasticizer causes pollution based on adhesion of dust thereto, and the alkyd paintability cannot be improved. If the molecular weight is too high, the viscosity becomes high so that the workability deteriorates. The molecular weight distribution of the polymeric plasticizer is not particularly limited, and a narrow distribution is preferred. The distribution is preferably less than 1.80, more preferably 1.70 or less, even more preferably 1.60 or less, even more preferably 1.50 or less, in particular preferably 1.40 or less, most preferably 1.30 or less.

In the case that the plasticizer is a polyether polymer, the number-average molecular weight is measured by terminal group analysis. In the case that the plasticizer is any other polymer, the number-average molecular weight is measured by a GPC method. The molecular weight distribution (Mw/Mn) is measured by the GPC method (in terms of polystyrene).

The polymeric plasticizer may have no reactive silicon group, or may have a reactive silicon group. When the plasticizer has a reactive silicon group, the plasticizer acts as a reactive plasticizer. Thus, the plasticizer can be prevented from being bleeded from the cured product. When the plasticizer has a reactive silicon group, the number of individuals of the reactive silicon group is preferably 1 or less, more preferably 0.8 or less per molecule on average. In the case of using a plasticizer having a reactive silicon group, in particular, an oxyalkylene polymer having a reactive silicon group, the number-average molecular weight thereof is preferably lower than that of the polymer(s) of the component (A). If not so, plasticizing effect may not be obtained.

About the plasticizer, only one species thereof may be used, or two or more species thereof may be used together. A low molecular weight plasticizer and a polymeric plasticizer may be used together. These plasticizers may be blended when the polymer(s) is/are produced.

The amount of the used plasticizer is from 5 to 150 parts by weight, preferably from 10 to 120 parts by weight, even more preferably from 20 to 100 parts by weight for 100 parts by weight of the polymer(s) of the component (A). If the amount is less than 5 parts by weight, effects as a plasticizer are not expressed. If the amount is more than 150 parts by weight, the mechanical strength of the cured product is insufficient.

A tackifier may be added to the composition of the present invention. The tackifier of resin (tackifying resin) is not particularly limited, and may be a resin that is usually used whether the resin is in a solid form or in a liquid form at normal temperature. Specific examples thereof include styrene based block copolymer, a hydrogenated product thereof, phenol resin, modified phenol resins (such as cashew oil modified phenol resin, tall oil modified phenol resin and the like), terpene-phenol resin, xylene-phenol resin, cyclopentadiene-phenol resin, coumalin-indene resin, rosin resin, rosin ester resin, hydrogenated rosin ester resin, xylene resin, low molecular weight polystyrene resin, styrene copolymer resin, petroleum resins (such as C5 hydrocarbon resin, C9 hydrocarbon resin, C5C9 hydrocarbon copolymer resin and the like), hydrogenated petroleum resins, terpene resin, and DCPD resin petroleum resin and the like. These may be used alone or in combination of two or more thereof. Examples of the styrene block copolymer and the hydrogenated product thereof include styrene-butadiene-styrene block copolymer (SBS), styrene-isoprene-styrene block copolymer (SIS), styrene-ethylenebutylene-styrene block copolymer (SEBS), styrene-ethylenepropylene-styrene block copolymer (SEPS), styrene-isobutylene-styrene copolymer (SIBS) and the like. These tackifying resins may be used alone or in combination of two or more thereof.

The tackifying resin is used in an amount of 5 to 1,000 parts by weight, preferably from 10 to 100 parts by weight for 100 parts by weight of the organic polymer(s) (A).

A solvent or a diluting agent can be added to the composition of the present invention. The solvent and the diluting agent are not particularly limited, and the following can be used: aliphatic hydrocarbons, aromatic hydrocarbons, alicyclic hydrocarbons, halogenated hydrocarbons, alcohols, esters, ketones, ethers and others. When the solvent or the diluting agent is used, the boiling point of the solvent is preferably 150° C. or higher, more preferably 200° C. or higher, in particular preferably 250° C. or higher in light of a problem of air pollution when the composition is used indoors. The above-mentioned solvents or diluting agents may be used alone or in combination of two or more thereof.

If necessary, a physical property adjustor for adjusting tensile characteristics of the cured product may be added to the curable composition of the present invention. The physical property adjustor is not particularly limited, and examples thereof include alkylalkoxysilanes such as methyltrimethoxysilane, dimethyldimethoxysilane, trimethylmethoxysilane, n-propyltrimethoxysilaneandthelike; alkoxysilanes having an unsaturated group, such as dimethyldiisopropenoxysilane, methyltriisopropenoxysilane, other alkylisopropenoxysilanes, vinyltrimethoxysilane, vinyldimethylmethoxysilane and the like; silicone vanish; polysiloxanes and the like. The use of the physical property adjustor makes it possible that when the composition of the present invention is cured, the hardness is raised or the hardness is conversely lowered so as to improve the property of elongation at break. The above-mentioned physical property adjustors may be used alone or in combination of two or more thereof.

In particular, a compound which can be hydrolyzed, thereby generating a compound having in the molecule thereof a monovalent silanol group has an effect of lowering the modulus of the cured product without deteriorating the tack of the surface of the cured product. A compound which can generate trimethylsilanol is particularly preferred. Examples of the compound which can be hydrolyzed, thereby generating a compound having in the molecule thereof a monovalent silanol group include compounds described in JP-A-5-17521. Other examples thereof include compounds which are each a derivative of an alkylalcohol such as hexanol, octanol, decanol and the like, and can each generate a silicon compound which can be hydrolyzed, thereby generating $R_3SiOH$ such as trimethylsilanol and the like; and compounds which are each a derivative of a polyhydric alcohol having 3 or more hydroxyl groups, such as trimethylolpropane, glycerin, pentaerythritol, sorbitol and the like, as described in JP-A-11-241029, and can each generate a silicon compound which can be hydrolyzed, thereby generating $R_3SiOH$ such as trimethylsilanol and the like.

Different examples thereof include compounds which are each a derivative of an oxypropylene polymer, and can each generate a silicon compound which can be hydrolyzed, thereby generating $R_3SiOH$ such as trimethylsilanol and the like, as described in JP-A-7-258534. Furthermore, there can be used a polymer having a crosslinkable, hydrolyzable silicon-containing group and a silicon-containing group which can be hydrolyzed so as to be converted to a monosilanol-containing compound, as described in JP-A-6-279693.

The physical property adjustor is used in an amount of 0.1 to 20 parts by weight, preferably 0.5 to 10 parts by weight for 100 parts by weight of the polymer(s) (A) having a reactive silicon group.

If necessary, a thixotropic agent (anti-sagging agent) may be added to the curable composition of the present invention to prevent the composition from sagging and to make the workability better. The anti-sagging agent is not particularly limited, and examples thereof include polyamide waxes; hydrogenated castor oil derivatives; and metal soaps such as calcium stearate, aluminum stearate, barium stearate and the like. In the case of using rubber powder having a particle diameter of 10 to 500 μm as described in JP-A-11-349916 or an organic fiber as described in JP-A-2003-155389, a composition having a high thixotropy and a good workability can be obtained. These thixotropic agents (anti-sagging agents) maybe used alone or in combination of two or more thereof. The thixotropic agent(s) is/are used in an amount of 0.1 to 20 parts by weight for 100 parts by weight of the polymer(s) (A) having a reactive silicon group.

In the composition of the present invention, a compound having in a single molecule thereof an epoxy group can be used. When the compound having an epoxy group is used, the recovery property of the cured product can be made high. Examples of the compound having an epoxy group include epoxidized unsaturated oils and fats, epoxidized unsaturated aliphatic acid esters, alicyclic epoxy compounds, epichlorohydrin derivatives and mixtures thereof, and the like. Specific examples thereof include epoxidized soybean oil, epoxidized linseed oil, bis(2-ethylhexyl)-4,5-epoxycyclohexane-1,2-dicarboxylate (E-PS), epoxyoctyl stearate, epoxybutyl stearate and the like. Among them, E-PS is particularly preferred. It is advisable to use the epoxy compound in an amount of 0.5 to 50 parts by weight for 100 parts by weight of the polymer(s) (A) having a reactive silicon group.

In the composition of the present invention, a photo-curable substance can be used. When the photo-curable material is used, a coating of the photo-curable substance is formed on the surface of the cured product. Thus, the tack or the weather resistance of the cured product can be improved. The photo-curable material is a material which undergoes a chemical change in molecular structure by action of light so as to generate a physical change such as curing. As a compound of this type, many materials are known, examples of which include organic monomers, oligomers, resins and compositions containing these materials and the like. Any commercially available products can be used. Typically, an unsaturated acrylic compound, a polyvinyl cinnamate, an azide resin or the like can be used. The unsaturated acrylic compound is a monomer or oligomer having one or more acrylic or methacrylic unsaturated groups, or a mixture thereof. Examples thereof include propylene (or butylene or ethylene) glycol di(meth)acrylate, neopentyl glycol di(meth)acrylate and the like, or oligoesters made from such a monomer and having a molecular weight of 10000 or less. Specific examples thereof include ARONIXM-210, ARONIX M-215, ARONIXM-220, ARONIXM-233, ARONIXM-240, and ARONIXM-245, which are each an especial (bifunctional) acrylate; (trifunctional) ARONIXM-305, ARONIXM-309, ARONIXM-310, ARONIX M-315, ARONIX M-320, and ARONIX M-325; and (polyfunctional) ARONIX M-400 and the like. In particular, compounds having an acrylic functional group are preferred, and compounds each containing in a single molecule thereof 3 or more acrylic functional groups on average are preferred. (The above-mentioned ARONIX are products manufactured by Toagosei Co., Ltd.)

The polyvinyl cinnamate is a photosensitive resin having a cinnamoyl group as a photosensitive group, and examples thereof include a product obtained by esterifying polyvinyl alcohol with cinnamic acid, and many polyvinyl cinnamate derivatives. The azide resin is known as a photosensitive resin having an azide group as a photosensitive group. An example thereof is a rubber photosensitive liquid wherein a diazide compound is usually added as a photosensitive agent. Detailed examples thereof are described in "Photosensitive Resin" (published on Mar. 17, 1972 by Insatsu Gakkai Shuppanbu Ltd., on and after p. 93, on and after p. 106, and on and after p. 117). These may be used alone or in a mixture form in a state that a sensitizer is added thereto if necessary. When a sensitizer such as a ketone, a nitro compound and the like, or an accelerator such as an amine and the like is added thereto, advantageous effects may be improved. It is advisable to use the photo-curable material in an amount of 0.1 to 20 parts by weight, preferably 0.5 to 10 parts by weight for 100 parts by weight of the polymer(s) (A) having a reactive silicon group. If the amount is less than 0.1 part by weight, no effect of improving the weather resistance is produced. If the amount is 20 parts or more by weight, the cured product becomes too hard so that the product tends to be cracked.

An oxygen curable material can be used in the composition of the present invention. Examples of the oxygen curable material include unsaturated compounds reactive with oxygen in air. The material reacts with oxygen in air to form a cured coating in the vicinity of the surface of the cured product, thereby fulfilling an act of preventing the tack of the surface or adhesion of wastes or dust onto the cured product surface. Specific examples of the oxygen curable material include drying oils, typical examples of which are tung oil and linseed oil; various alkyd resins obtained by modifying the compounds; acrylic polymer, epoxy resin, and silicone resin which are each modified with a drying oil; liquid polymers such as 1,2-polybutadiene, 1,4-polybutadiene, C5 to C8 diene polymer and the like, which are each obtained by polymerizing or copolymerizing one or more diene compounds such as butadiene, chloroprene, isorepene, and/or 1,3-pentadiene; liquid copolymers such as NBR, SBR and the like, which are each obtained by copolymerizing a monomer copolymerizable with the diene compounds, such as acrylonitrile, styrene and the like, with one or more of the diene compounds so as to make the diene compound(s) into one or more main components; and various modified products thereof (such as maleic acid modified products boiled oil modified products and the like). These may be used or in combination of two or more thereof. Among them, tung oil and liquid diene polymers are particularly preferred. When a catalyst for promoting the oxidization curing reaction or a metal drier is used together, the advantageous effects maybe enhanced. Examples of the catalyst or metal drier include metal salts such as cobalt naphthenate, lead naphthenate, zirconium naphthenate, cobalt octanoate, zirconium octanonate and the like; and amine compounds and the like. The use amount of the oxygen curable material is preferably from 0.1 to 20 parts by weight, more preferably 0.5 to 10 parts by weight for 100. parts by weight of the polymer (s) (A) having a reactive silicon group. If the use amount is less than 0.1 part by weight, an improvement in pollution resistance is insufficient. If the amount is more than 20 parts by weight, the tensile characteristic or the like of the cured product tends to be damaged. As described in JP-A-3-160053, it is desired to use the oxygen curable material together with the photo-curable material.

An antioxidant (anti-aging agent) can be used in the composition of the present invention. When the antioxidant is used, the heat resistance of the cured product can be enhanced. Examples of the antioxidant include hindered phenols, monophenols, bisphenols, and polyphenols. Particularly preferred are hindered phenols. Similarly, the following can also be used: a hindered amine photostabilizer named TINUVIN 622LD, TINUVIN 144, CHIMASSORB 944LD, or CHIMASSORB 119FL (which is manufactured by Ciba Specialty Chemicals Inc.); MARK LA-57, MARK LA-62, MARK LA-67, MARK LA-63, or MARK LA-68 (which is manufactured by Asashi Denka Kogyo K.K. ); or SANOL LS-770, SANOL LS-765, SANOL LS-292, SANOL LS-2626, SANOL LS-1114, or SANOL LS-744 (which is manufactured by Sankyo Co., Ltd.). Specific examples of the antioxidant are described in JP-A-4-283259 and 9-194731 also. The use amount of the antioxidant is preferably from 0.1 to 10 parts by weight, more preferably from 0.2 to 5 parts by weight for 100 parts by weight of the polymer(s) (A) having a reactive silicon group.

A photostabilizer can be used in the composition of the present invention. The use of the photostabilizer makes it possible to prevent the cured product form being deteriorated by photo-oxidation. Examples of the photostabilizer include benzotriazole compounds, hindered amine compounds, benzoate compounds and the like. Particularly preferred are hindered amine compounds. The use amount of the photostabilizer is preferably from 0.1 to 10 parts by weight, more preferably from 0.2 to 5 parts by weight for 100 parts by weight of the polymer(s) (A) having a reactive silicon group. Specific examples of the photostabilizer are described in JP-A-9-194731 also.

In the case of using the photocurable material, in particular, an unsaturated acrylic compound together in the composition of the present invention, it is preferred to use a tertiary-amine-containing hindered amine photostabilizer as a hindered amine photostabilizer, as described in JP-A-5-70531, in order to improve the storage stability of the composition. Examples of the tertiary-amine-containing hindered amine photostabilizer include photostabilizers named TINUVIN 622LD, TINUVIN 144, and CHIMASSORB 119FL (each manufactured by Ciba Specialty Chemicals Inc.); MARKLA-57, MARKLA-62, MARKLA-67, and MARK LA-63 (each manufactured by Asashi Denka Kogyo K.K.); and SANOL LS-765, SANOL LS-292, SANOL LS-2626, SANOL LS-1114, SANOL LS-744 (each manufactured by Sankyo Co., Ltd.) and the like.

An ultraviolet absorber can be used in the composition of the present invention. The use of the ultraviolet absorber makes it possible to enhance the surface weather resistance of the cured product. Examples of the ultraviolet absorber include benzophenone compounds, benzotriazole compounds, salicylate compounds, substituted tolyl compounds, metal chelate compounds and the like. Particularly preferred are benzotriazole compounds. The use amount of the ultraviolet absorber is preferably from 0.1 to 10 parts by weight, more preferably from 0.2 to 5 parts by weight for 100 parts by weight of the polymer(s) (A) having a reactive silicon group. It is preferred to use a phenolic or hindered phenolic antioxidant with a hindered amine photostabilizer, and a benzotriazole ultraviolet absorber together.

An epoxy resin can be added to the composition of the present invention. The composition to which the epoxy resin is added is particularly preferred as an adhesive, in particular, as an adhesive for outer wall tiles. Examples of the epoxy resin include epichlorohydrin-bisphenol A epoxy resin, epichlorohydrin-bisphenol F epoxy resin, glycidyl ether of tetrabromobisphenol A, other flame retardant epoxy resins, novolak epoxy resin, hydrogenated bisphenol A epoxy resin, glycidyl ether type epoxy resin of a bisphenol A propylene oxide adduct, glycidyl ether ester type epoxy resin of p-oxybenzoic acid, m-aminophenol epoxy resin, diaminodiphenylmethane epoxy resin, urethane-modified epoxy resin, various alicyclic epoxy resins, N,N-diglycidylaniline, N,N-diglycidyl-o-toluidine, triglycidyl isocyanurate, polyalkylene glycol diglycidyl ether, glycerin, other glycidyl ethers of polyhydric alcohol, hydantoin type epoxy resin, petroleum resin, and other epoxidized unsaturated polymers. However, the epoxy resin is not limited thereto, and any epoxy resin that is ordinarily used can be used. Preferred is an epoxy resin having, in the molecule thereof, at least two epoxy groups since a high reactivity is exhibited when the resin is cured and a three-dimensional network structure is easily formed in the cured product. More preferred is bisphenol A epoxy resin, novolak epoxy resin or the like. The ratio by weight of the used epoxy resin to the polymer(s) (A) having a reactive silicon group ranges from 100/1 to 1/100. If the ratio of the (A) to the epoxy resin is less than 1/100, the impact strength of the epoxy resin cured product or the toughness-improving effect thereof is not easily obtained. If the ratio of the (A)/to the epoxy resin is more than 100/1, the strength of the organic polymer cured product becomes insufficient. A preferred use ratio therebetween is not decided without reservation since the ratio is varied in accordance with the usage of the curable resin composition, or the like. In the case of improving, for example, the impact resistance, flexibility, toughness, peel strength or the like of the epoxy resin cured product, the component (A) is/are used preferably in an amount of 1 to 100 parts by weight, more preferably in an amount of 5 to 100 parts by weight for 100 parts by weight of the epoxy resin. In the case of improving the strength of the cured product of the component (s) (A), the epoxy resin is used preferably in an amount of 1 to 200 parts by weight, more preferably in an amount of 5 to 100 parts by weight for 100 parts by weight of the component (A).

In the case of the addition of the epoxy resin, a curing agent for curing the epoxy resin can be naturally be used together in the curable composition of the present invention. The epoxy resin curing agent which can be used is not particularly limited, and may be any epoxy resin curing agent that is ordinarily used. Specific examples thereof include primary and secondary amines such as triethylenetetramine, tetraethylenepentamine, diethylaminopropylamine, N-aminoethylpiperidine, m-xylylenediamine, m-phenylenediamine, diaminodiphenylmethane, diaminodiphenylsulfone, isophoronediamine, amine-terminated polyether and the like; tertiary amines such as 2,4,6-tris(dimethylaminomethyl)phenol andtripropylamine, and salts of these tertiary amines; polyamide resins; imidazoles; dicyandiamines; trifluoroboron complex compounds; carboxylic anhydrides such as phthalic anhydride, hexahydrophthalic anhydride, tetrahydrophthalic anhydride, dodecylsuccinic anhydride, pyromellitic anhydride, chlorendic anhydride and the like; alcohols; phenols; carboxylic acids; and diketone complex compounds of aluminum or zirconium, and the like. However, the curing agent is not limited thereto. The above-mentioned curing agents may be used alone or in combination of two or more thereof.

When the epoxy resin curing agent is used, the use amount thereof ranges from 0.1 to 300 parts by weight for 100 parts by weight of the epoxy resin.

A ketimine can be used as the epoxy resin curing agent. The ketimine is stably present in a state that there is no water content, and is dissolved into a primary amine and a ketone by water content. The resultant primary amine becomes a curing agent for epoxy resin which can be cured at room temperature. When the ketimine is used, a one-component composition can be obtained. Such a ketimine compound can be obtained by condensation reaction between an amine compound and a carbonyl compound.

In order to synthesize the ketimine, a known amine compound and a known carbonyl compound may be used. As the amine compound, the following is used: a diamine such as ethylenediamine, propylenediamine, trimethylenediamine, tetramethylenediamine, 1,3-diaminobutane, 2,3-diaminobutane, pentamethylenediamine, 2,4-diaminopentane, hexamethylenediamine, p-phneylenediamine, p,p'-biphenylenediamine or the like; a polyhydric amine such as 1,2,3-triaminopropane, triaminobenzene, tris (2-aminoethyl) amine, tetrakis(aminomethyl)methane or the like; a polyalkylenepolyamine such as diethylenetriamine, triethylenetriamine, tetraethylenepentamine or the like; a polyoxyalkylene polyamine; an aminosilane such as γ-aminopropyltriethoxysilane, N-(β-aminoethyl)-γ-aminopropyltrimethoxysilane, N-(β-aminoethyl)-γ-aminopropylmethyldimethoxysilane or the like; or the like. As the carbonyl compound, the following can be used: an aldehyde such as acetoaldehyde, propionaldehyde, n-butylaldehyde, isobutylaldehyde, diethylacetoaldehyde, glyoxal, benzaldehyde or the like; a cyclic ketone such as cyclopentanone, trimethylcyclopentanone, cyclohexanone, trimethylcyclohexanone or the like; an aliphatic ketone such as acetone, methyl ethyl ketone, methyl propyl ketone, methyl isopropyl ketone, methyl isobutyl ketone, diethyl ketone, dipropyl ketone, diisopropyl ketone, dibutyl ketone, diisobutyl ketone or the like; a β-dicarbonyl compound such as acetylacetone, methyl acetoacetate, ethyl acetoacetate, dimethyl malonate, diethyl malonate, methylethyl malonate, dibenzoylmethane or the like; or the like.

When an imino group is present in the ketimine, the imino group may be caused to react with styrene oxide, a glycidyl ether such as butyl glycidyl ether allyl glycidyl ether or the like, a glycidyl ester, or the like. The above-mentioned ketimines may be used alone or in combination of two or more thereof. The use amount thereof is from 1 to 100 parts by weight for 100 parts by weight of the epoxy resin, and is varied in accordance with the kind of the epoxy resin and that of the ketimine.

A flame retardant may be added to the curable composition of the present invention, examples of the retardant including a phosphorus-containing plasticizer such as ammonium polyphosphate, tricresyl phosphateor the like; aluminum hydroxide, magnesium hydroxide, or thermally expandable graphite or the like. These flame retardants may be used alone or in combination of two or more thereof.

The flame retardant is used in an amount of 5 to 200 parts by mass, preferably 10 to 100 parts by mass for 100 parts by weight of the total of the component (A) and the component (B).

If necessary, various additives maybe added to the curable composition of the present invention in order to adjust various physical properties of the curable composition or the cured product. Examples of the additives include a curability adjustor, a radical inhibitor, a metal inactivating agent, an ozone deterioration preventive, a phosphorus-containing peroxide decomposer, a lubricant, a pigment, a foaming agent, an ant preventive, and an antifungal agent. These additives may be used alone or in combination of two or more thereof. Specific examples of additives other than the specific examples of the additives described in the specification are described in JP-B-4-69659 and 7-108928, and JP-A-63-254149, 64-22904 and 2001-72854, and other publications.

The curable composition of the present invention can be prepared into a one component form, wherein all blend components are beforehand blended, air-tightly sealed up and stored, and after the resultant blend is actually used, the blend is cured with moisture in the air. Alternatively, the composition can be prepared into a two-component form, wherein a curing catalyst, a filler, a plasticizer, water and other components are separately blended with each other as a curing agent, and this blend and a polymer composition are mixed before used. From the viewpoint of workability, the one-component form is preferred.

In the case that the curable composition is in a one component form, all of the blend components are beforehand blended with each other; therefore, it is preferred that the blend components which contain water content are used after dehydrating and drying in advance, or are dehydrated by pressure-reduction when the components are blended and kneaded. In the case that the curable composition is in a two-component form, it is unnecessary to blend a curing catalyst with the main agent containing the polymer(s) having a reactive silicon group; therefore, it is hardly feared that the blend components are gelatinized even if the components contain a certain amount of water content. However, in the case that the composition is required to have storage stability for a long term, the composition is preferably dehydrated and dried. Preferred examples of the method for the dehydration and drying include a heating drying method when the composition is in the form of a solid such as powder; and a pressure-reducing dehydrating method or a dehydrating method using synthetic zeolite, activated alumina, silica gel, caustic lime, magnesium oxide or the like when the composition is in a liquid form. It is allowable to incorporate a small amount of an isocyanate compound into the composition to cause the isocyanate group to react with water, thereby attaining dehydration, or to incorporate an oxazolidine compound such as 3-ethyl-2-methyl-2-(3-methylbutyl)-1,3-oxazolidine or the like to cause the compound to react with water, thereby attaining dehydration. By the addition of the following compound besides this dehydration drying method, the storage stability is made better by adding the following compound: a lower alcohol such as methanol or ethanol; or an alkoxysilane compound such as n-propyltrimethoxysilane, vinyltrimethoxysialne, vinylmethyldimethoxysilane, methyl silicate, ethyl silicate, γ-mercaptopropylmethyldimethoxysilane, γ-mercaptopropylmethyldiethoxysilane or the like.

The use amount of the dehydrating agent, in particular, a silicon compound reactive with water, such as vinyltrimethoxysilane or the like, is preferably from 0.1 to 20 parts by weight, more preferably from 0.5 to 10 parts by weight for 100 parts by weight of the polymer(s) (A) having a reactive silicon group.

The method for preparing the curable composition of the present invention is not particularly limited, and a usual method is adopted, an example of the method being a method of blending the above-mentioned components with each other, then using a mixer, a roll, a kneader or the like to knead the blend at normal temperature or while the blend is heated, or a method of using a small amount of an appropriate solvent to dissolve the above-mentioned components therein, and then mixing the components, or other methods.

When the curable composition of the present invention is exposed to the atmosphere, the composition forms a three-dimensional network structure by action of moisture, so as to be cured into a solid having rubbery elasticity.

The curable composition of the present invention can be used for a binder, a sealing compound for a building, ship, car, road or the like, an adhesive, a mold or pattern-forming material, a vibration isolating material, a vibration reducing material, a sound proof material, a foaming material, a paint, a spraying material, and so on. The composition is more preferably used as a sealing compound or an adhesive, out of the above-mentioned materials, since the cured product obtained by curing the curable composition of the present invention is excellent in flexibility and adhesiveness.

The curable composition can be used for various articles, such as electrical/electronic part materials such as a solar cell rear face sealing compound and the like, electrically insulating materials such as an insulating coating material for electric wires/cables and the like, elastic adhesives, contact-type adhesives, spray type sealing compounds, crack repairing materials, tiling adhesives, powdery paints, casting materials, rubber materials for medical treatment, adhesives for medical treatment, medical instrument sealing compounds, food wrapping materials, joint sealing compounds for outer packaging materials such as a siding board and the like, coating materials, primers, electromagnetic-wave-shielding electroconductive materials, thermally conductive materials, hot melt materials, electrical and electronic potting agents, films, gaskets, various molding materials, rust resisting/waterproof sealing compounds for an end face (cut portion) of net-incorporated glass or laminated glass, and liquid sealing compounds used in automobile parts, electrical parts, or various mechanical parts. Furthermore, the curable composition can adhere closely to various substrates such as glass, ceramic, wood, metal, resin molded product substrates and the like by itself or by aid of a primer; therefore, the curable composition can also be used as various types of sealing compositions or adhesive compositions. Moreover, the curable composition of the present invention can be used as an adhesive for interior panels, an adhesive for exterior panels, a tiling adhesive, a stone-material-laying adhesive, a ceiling finishing adhesive, a floor finishing adhesive, a wall finishing adhesive, an adhesive for automobile panels, an electrical/electronic/precision instrument fabricating adhesive, a direct glazing sealing compound, a sealing compound for double glazing, a sealing compound for the SSG method, or a sealing compound for working joints of a building.

EXAMPLES

The present invention will be specifically described by the following working examples and comparative examples; however, the present invention is not limited to these examples.

Synthesis Example 1

Polyoxypropylene diol having a molecular weight of about 2,000 was used as an initiator to polymerize propylene oxide in the presence of a zinc hexacyanocobalate glyme catalyst to yield a polypropylene oxide having at its terminals hydroxyl groups and having a number-average molecular weight of about 25,500, which was a molecular weight in terms of polystyrene measured by use of an HLC-8120 GPC manufactured by Tosoh Corp. as a liquid-feeding system, a TSK-GEL H type column manufactured by Tosoh Corp., and THF as a solvent. Subsequently, a solution of NaOMe in methanol was added thereto at an equivalent 1.2 times the amount of the hydroxyl groups of this hydroxyl-group-terminated polypropylene oxide, and methanol was distilled off. Furthermore, allyl chloride was added thereto so as to convert the hydroxyl groups at the terminals to allyl groups. Unreacted allyl chloride was volatilized and removed under reduced pressure. Into 100 parts by weight of the resultant crude allyl-group-terminated polypropylene oxide were incorporated 300 parts by weight of n-hexane and 300 parts by weight of water, and then the mixture was stirred. Water was then removed therefrom by centrifugal separation. Furthermore, 300 parts by weight of water were incorporated into the resultant solution in hexane, and then the mixture was stirred. Water was again removed therefrom by centrifugal separation, and then hexane was volatilized and removed under reduced pressure. This way gave an allyl-group-terminated bifunctional polypropylene oxide (P-1) having a number-average molecular weight of about 25,500.

150 ppm of a solution of a platinum vinylsiloxane complex, the platinum content by percentage being 3% by weight, was used as a catalyst to cause 1.1 parts by weight of trimethoxysilane to react with 100 parts by weight of the resultant allyl-group-terminated polypropylene oxide (P-1) at 90° C. for 2 hours, so as to yield a trimethoxysilyl-group-terminated polyoxypropylene polymer (A-1). According to measurement by $^1$H-NMR (in a $CDCl_3$ solvent by use of a JNM-LA400 manufactured by JEOL Ltd.), the number of the trimethoxysilyl groups at the terminals was 1.3 per molecule on average.

Synthesis Example 2

Into a reaction vessel were charged 1.64 g of chloromethylmethyldichlorosilane and 20 mL of diethyl ether in the atmosphere of nitrogen, and then the solution was stirred with a magnetic stirrer. Thereto was dropwise added 0.70 g of methanol at 0° C. Next, thereto was dropwise added 15.8 g of pyridine. The solution was stirred for about 30 minutes, and the resultant precipitation was separated by filtration. From the filtrate, methanol and diethyl ether were volatilized and removed under reduced pressure, and then the filtrate was distilled under reduced pressure to yield chloromethyldimethoxymethylsilane. $^1$H NMR spectrum (CDCl$_3$) of the product: 0.24 ppm (3H), 2.77 ppm (2H), and 3.56 ppm (6H).

Synthesis Example 3

The same operations as in Synthesis Example 2 were performed except that 2.10 g of 3,3,3-trifluoropropylmethyldichlorosilane was used instead of chloromethylmethyldichlorosilane in Synthesis Example 2, so as to yield 3,3,3-trifluoropropyldimethoxymethylsilane. $^1$H NMR spectrum (CDCl$_3$) of the product: 0.13 ppm (3H), 0.80 ppm (2H), 2.08 ppm (2H), and 3.50 ppm (6H).

Examples 1 to 7, and Comparative Examples 1 to 8

The polymer (A-1) was weighed and put into each mini-cup, and then thereto were added an organic tin compound or an amine compound (B) as a silanol condensation catalyst, and one out of various silicon compounds, as shown in Table 1. The resultant was sufficiently kneaded with a spatula for 2 minutes, and allowed to stand still under the condition of a constant temperature of 25° C. and a constant humidity of 50%. This time was defined as the curing start time. At intervals of 1 minute, a tip of the spatula was brought into contact with the composition surface. The time until the composition came not to adhere onto the spatula was defined as the skin formation time. In this way, the curing time was measured. The results are shown in Table 1.

TABLE 1

| Composition (parts by weight) | | | Examples | | | | | | | Comparative Examples | |
|---|---|---|---|---|---|---|---|---|---|---|---|
| | | | 1 | 2 | 3 | 4 | 5 | 6 | 7 | 1 | 2 |
| Polymer (A) | A-1 | | 100 | 100 | 100 | 100 | 100 | 100 | 100 | 100 | 100 |
| Amine compound (B) | DBU$^{(1)}$ | San-Apro Co., Ltd. | 2 | 2 | 2 | 2 | 2 | 2 | 2 | 2 | 2 |
| Organic tin compound | Neostanne U-220$^{(2)}$ | Nitto Kasei Co., Ltd. | | | | | | | | | |
| Silicon compound (C) | Chloromethyl-trimethoxysilane$^{(3)}$ | Shin-Etsu Chemical Co., Ltd. | 0.55 | | | | | | | | |
| | Chloromethyldimethoxy-methylsilane$^{(4)}$ | | | 0.5 | | | | | | | |
| | 3,3,3-Trifluoropropyldimethoxy-methylsilane$^{(5)}$ | | | | 0.5 | | | | | | |
| | Acetoxymethyl-triethoxysilane$^{(6)}$ | AZmax Co., Ltd. | | | | 0.76 | | | | | |
| | Mercaptomethyl-trimethoxysilane$^{(7)}$ | Shin-Etsu Chemical Co., Ltd. | | | | | 0.54 | | | | |
| | Bis(pentafluorophenyl)dimethoxysilane$^{(8)}$ | AZmax Co., Ltd. | | | | | | 1 | | | |
| | Fluorotriethoxysilane | AZmax Co., Ltd. | | | | | | | 0.5 | | |
| Silicon compound other than (C) | Trimethoxymethylsilane | Shin-Etsu Chemical Co., Ltd. | | | | | | | | | 0.44 |
| | Dimethoxydimethylsilane | AZmax Co., Ltd. | | | | | | | | | |
| | Dimethoxydiphenylsilane | Wako Pure Chemical Industries Co., Ltd. | | | | | | | | | |
| Curability | Skin formation time | (minutes) | 20 | 20 | 18 | 16 | 25 | 7 | <1 | 36 | 35 |

TABLE 1-continued

|  | Composition (parts by weight) |  | Comparative Examples ||||||
|---|---|---|---|---|---|---|---|---|
|  |  |  | 3 | 4 | 5 | 6 | 7 | 8 |
| Polymer (A) |  | A-1 | 100 | 100 | 100 | 100 | 100 | 100 |
| Amine compound (B) | DBU[1] | San-Apro Co., Ltd. | 2 | 2 |  |  |  |  |
| Organic tin compound | Neostanne U-220[2] | Nitto Kasei Co., Ltd. |  |  | 0.2 | 0.2 | 0.2 |  |
| Silicon compound (C) | Chloromethyl-trimethoxysilane[3] | Shin-Etsu Chemical Co., Ltd. |  |  |  |  | 0.55 |  |
|  | Chloromethyldimethoxy-methylsilane[4] |  |  |  |  |  |  |  |
|  | 3,3,3-Trifluoropropyldimethoxy-methylsilane[5] |  |  |  |  |  |  |  |
|  | Acetoxymethyl-triethoxysilane[6] | AZmax Co., Ltd. |  |  |  |  |  |  |
|  | Mercaptomethyl-trimethoxysilane[7] | Shin-Etsu Chemical Co., Ltd. |  |  |  |  |  |  |
|  | Bis(pentafluorophenyl) dimethoxysilane[8] | AZmax Co., Ltd. |  |  |  |  |  |  |
|  | Fluorotriethoxysilane | AZmax Co., Ltd. |  |  |  |  | 0.5 | 10 |
| Silicon compound other than (C) | Trimethoxymethylsilane | Shin-Etsu Chemical Co., Ltd. |  |  |  |  |  |  |
|  | Dimethoxydimethylsilane | AZmax Co., Ltd. | 0.39 |  |  |  |  |  |
|  | Dimethoxydiphenylsilane | Wako Pure Chemical Industries Co., Ltd. |  | 0.72 |  |  |  |  |
| Curability | Skin formation time | (minutes) | 35 | 38 | 9 | >2 H | >2 H | >24 H |

[1] 1,8-Diazabicyclo[5.4.0]-7-undecene
[2] Dibutyltin (IV) bisacetylacetonate Metal (Sn) content: 27.5%
[3] $ClCH_2Si(OCH_3)_3$
[4] $ClCH_2(CH_3)Si(OCH_3)_2$
[5] $CF_3CH_2CH_2(CH_3)Si(OCH_3)_2$
[6] $CH_3C(=O)OCH_2Si(OCH_2CH_3)_3$
[7] $HSCH_2Si(OCH_3)_3$
[8] $(C_6F_5)_2Si(OCH_3)_2$ As in the Examples, compositions to which the silicon compound (C) was added together with DBU as a silanol condensation catalyst exhibited better curability than the cases where the silicon compound (C) was never added. The effect of the addition of bispentafluorophenyldimethoxysialne and that of fluorotriethoxysilane were particularly remarkable. On the other hand, as in the Comparative Examples, the addition of each of the alkoxysilanes having no electron withdrawing group did not cause any improvement in the curability. When the organic tin compound was used as a silanol condensation catalyst, the curability was conversely lowered by the addition of the silicon compound (C). When the amine of the component (B) was not added and only fluorotriethoxysialne of the component (C) was added, curing activity was not obtained.

Synthesis Example 4

150 ppm of a solution of a platinum vinylsiloxane complex, the platinum content by percentage being 3% by weight, was used as a catalyst to cause 0.66 part by weight of a hydrosilane compound represented by the following chemical formula: $HSi(CH_3)_2OSi(CH_3)_2C_2H_4Si(OCH_3)_3$ to react with 100 parts by weight of a vinyl-terminated polydimethylsiloxane (DMSV 42, manufactured by Gelest Co.) at 90° C. for 2 hours, so as to yield a trimethoxysilyl-group-terminated polydimethylsiloxane (A-2) According to measurement by $^1H$-NMR, the number of the trimethoxysilyl groups at the terminals was 1.2 per molecule on average.

Examples 8 and 9, and Comparative Examples 9 and 10

The polymer (A-2) was used to prepare each composition in accordance with each formulation shown in Table 2, and then the curing time was measured in the same way as described above. The results are shown in Table 2.

TABLE 2

| Composition (parts by weight) | | | Examples 8 | Examples 9 | Comparative Examples 9 | Comparative Examples 10 |
|---|---|---|---|---|---|---|
| Polymer (A) | A-2 | | 100 | 100 | 100 | 100 |
| Amine compound (B) | DBU(1) | San-Apro Co., Ltd. | 2 | 0.54 | 2 | |
| Silicon compound (C) | Fluorotriethoxysilane | AZmax Co., Ltd. | 0.5 | 0.16 | | 2 |
| Curability | Skin formation time | (minutes) | 1 | 1 | >3 H | >72 H |

(1): 1,8-Diazabicyclo[5.4.0]-7-undecene

About the polydimethylsiloxane polymer (A-2) also, a remarkable curability-improving effect was obtained by the addition of the silicon compound (C).

Examples 10 to 15, and Comparative Examples 11 to 13

In accordance with each formulation shown in Table 3, each composition was prepared, and the curing time thereof was measured in the same way as described above. The results are shown in Table 3.

TABLE 3

| Composition (parts by weight) | | | Examples 10 | Examples 11 | Examples 12 | Examples 13 | Examples 14 | Examples 15 | Comparative Examples 11 | Comparative Examples 12 | Comparative Examples 13 |
|---|---|---|---|---|---|---|---|---|---|---|---|
| Polymer (A) | A-1 | | 100 | 100 | 100 | 100 | 100 | 100 | 100 | 100 | 100 |
| Amine compound (B) | DBU(1) | San-Apro Co., Ltd. | 2 | 0.1 | | | | | | | |
| | Octylamine | Wako Pure Chemical Industries Co., Ltd. | | | 2 | 0.7 | | | 5 | | |
| | DEAPA(2) | Wako Pure Chemical Industries Co., Ltd. | | | | | 2 | | | 5 | |
| | A1110(3) | Nippon Unicar Co., Ltd. | | | | | | 2 | | | 2 |
| Silicon compound (C) | Bis(pentafluorophenyl)-dimethoxysilane(4) | AZmax Co., Ltd. | 0.5 | | 1 | | 1 | | | | |
| | Fluorotriethoxysilane | AZmax Co., Ltd. | | 0.05 | | 0.14 | | 0.5 | | | |
| Curability | Skin formation time | (minutes) | 20 | 1 | 110 | 3 | 170 | 18 | >5 H | 240 | >2 Day |

(1) 1,8-Diazabicyclo[5.4.0]-7-undecene
(2) 3-Diethylaminopropylamine
(3) $H_2NC_3H_6Si(OCH_3)_3$
(4) $(C_6F_5)_2Si(OCH_3)_2$ About each of the amine compounds, the curability-improving effect by the addition of the silicon compound (C) was obtained.

Synthesis Example 5

The same operations as in Synthesis Example 1 were performed except that 0.9 part by weight of methyldimethoxysilane was used instead of the silicon compound in Synthesis Example 1, so as to yield a methyldimethoxysilyl-group-terminated polyoxypropylene polymer (A-3). According to measurement by $^1$H-NMR, the number of the methyldimethoxysilyl groups at the terminals was 1.3 per molecule on average.

Examples 16 to 18, and Comparative Example 14

The polymer (A-3) was used to prepare each composition in accordance with each formulation shown in Table 4, and then the curing time was measured in the same way as described above. The results are shown in Table 4.

TABLE 4

| Composition (parts by weight) | | | Examples | | | Comparative Example |
|---|---|---|---|---|---|---|
| | | | 16 | 17 | 18 | 14 |
| Polymer (A) | A-3 | | 100 | 100 | 100 | 100 |
| Amine compound (B) | DBU[(1)] | San-Apro Co., Ltd. | 1 | 0.5 | 1 | 2 |
| | A1110[(2)] | Nippon Unicar Co., Ltd. | | | 3 | |
| Silicon compound (C) | Fluorotriethoxysilane | AZmax Co., Ltd. | 0.5 | 0.5 | 0.5 | |
| Dehydrating agent | A171[(3)] | Nippon Unicar Co., Ltd. | | | | 2 |
| Curability | Skin formation time | (minutes) | 3 | 7 | 15 | >6 H |

[(1)]1,8-Diazabicyclo[5.4.0]-7-undecene
[(2)]$H_2NC_3H_6Si(OCH_3)_3$
[(3)]Vinyltrimethoxysilane About each of the amine compounds, the curability-improving effect by the addition of the silicon compound (C) was obtained.

Examples 19 to 21, and Comparative Examples 15 and 16

In accordance with each formulation shown in Table 5, the polymer (A-1) and fillers were kneaded to prepare each main agent.

Under the condition of a constant temperature of 23° C. and a constant humidity of 50%, a dehydrating agent and a silicon compound (C) were first added to each of the main agents. The mixture was sufficiently kneaded with a spatula for 3 minutes to attain homogeneous dispersion. Next, one or more amine compounds were mixed therewith, and further the mixture was kneaded for 3 minutes. Thereafter, air bubbles in the blend were sufficiently removed. The surface was adjusted into a smooth surface to set the thickness of the blend into about 3 mm. This time was defined as the curing start time, and the curing time was measured. At intervals of 1 minute, a tip of the spatula was brought into contact with the blend surface. The time until the blend came not to adhere onto the spatula was defined as the skin formation time. The blend was caused to adhere closely to an adhesion substrate (an anodic oxidation aluminum, a vinyl chloride steel plate, an acrylic resin plate, or a polycarbonate resin plate) to give a size about 30 mm in length, about 15 mm in width and about 10 mm in thickness, and then the resultant was allowed to stand still for curing under the condition of a constant temperature of 23° C. and a constant humidity of 50% for 7 days. The adhesiveness thereof was evaluated in accordance with a 90-degree hand peel test. The evaluation of the adhesiveness was made by observing the breakdown state of the cured product. In the table, a product having an cohesion failure ratio of 90% or more, 50% or more less than 90%, 10% or more and less than 50%, or less than 10% is represented by A, B, C or D, respectively. The results are shown in Table 5.

TABLE 5

| Composition (parts by weight) | | | Examples | | | Comparative Examples | |
|---|---|---|---|---|---|---|---|
| | | | 19 | 20 | 21 | 15 | 16 |
| Organic polymer (A) | A-1 | | 100 | 100 | 100 | 100 | 100 |
| Fillers | Hakuenka CCR[(1)] | Shiraishi Kogyo Co., Ltd. | 50 | 50 | 50 | 50 | 50 |
| | Whiton SB[(2)] | Shiraishi Calcium Co., Ltd. | 50 | 50 | 50 | 50 | 50 |
| Dehydrating agent | A171[(3)] | Nippon Unicar Co., Ltd. | 2 | 2 | 2 | 2 | 2 |
| Silicon compound (C) | Fluorotriethoxysilane | AZmax Co., Ltd. | 0.5 | 0.5 | 0.5 | | |
| Amine compound (B) | A1110[(4)] | Nippon Unicar Co., Ltd. | 3 | 3 | 3 | 3 | 3 |
| | DBU[(5)] | San-Apro Co., Ltd. | 0.25 | 0.1 | | 0.5 | |
| Curability | Skin formation time | (minutes) | 12 | 45 | 150 | 130 | Not cured |

TABLE 5-continued

| | | | Examples | | | Comparative Examples | |
|---|---|---|---|---|---|---|---|
| Composition (parts by weight) | | | 19 | 20 | 21 | 15 | 16 |
| Adhesiveness | 90° Hand peel | Anodic oxidation aluminum | A | A | A | A | — |
| | | Hard vinyl chloride | A | A | A | A | — |
| | | Acrylic plate | A | A | A | A | — |
| | | Polycarbonate | B | A | A | A | — |

[1]Colloidal calcium carbonate
[2]Ground calcium carbonate
[3]Vinyltrimethoxysilane
[4]$H_2NC_3H_6Si(OCH_3)_3$
[5]1,8-Diazabicyclo[5.4.0]-7-undecene As shown in Table 5, the addition of the silicon compound (C) caused a remarkable improvement in the curability. About the adhesiveness, all of the compositions exhibited good adhesiveness. On the other hand, in the case of using only A1110 without adding the silicon compound (C), the composition was not sufficiently cured, either, after it was allowed to stand still for curing for 7 days. Thus, the adhesiveness was unable to be evaluated.

Example 22, and Comparative Example 17

In accordance with each formulation shown in Table 6, the polymer (A-1), a filler, titanium oxide, a plasticizer, and an anti-sagging agent were mixed and kneaded by use of a mixer, so as to prepare each main agent.

In the same ways as described above, the curing time and the adhesiveness were evaluated. The results are shown in Table 6.

TABLE 6

| Composition (parts by weight) | | | Example 22 | Comparative Example 17 |
|---|---|---|---|---|
| Polymer (A) | | A-1 | 100 | 100 |
| Filler | Hakuenka CCR[1] | Shiraishi Kogyo Co., Ltd. | 120 | 120 |
| Titanium oxide | Tipaque R-820 | Ishihara Sangyo Co., Ltd. | 20 | 20 |
| Plasticizer | DIDP[2] | Kyowa Hakko Co., Ltd. | 50 | 50 |
| Anti-sagging agent | Disparlon #6500[3] | Kusumoto Chemicals Co., Ltd. | 2 | 2 |
| Dehydrating agent | A171[4] | Nippon Unicar Co., Ltd. | 2 | 2 |
| Silicon compound (C) | Fluorotriethoxy-silane | Azmax Co., Ltd. | 0.5 | |
| Amine compounds (B) | A1110[5] | Nippon Unicar Co., Ltd. | 3 | 3 |
| | DBU[6] | San-Apro Co., Ltd. | 0.5 | 0.5 |
| Curability | Skin formation time | (minutes) | 100 | 180 |
| Adhesiveness | 90° Hand peel | Anodic oxidation aluminum | A | A |
| | | Acrylic plate | A | A |

[1]Colloidal calcium carbonate
[2]Diisodecyl phthalate
[3]Aliphatic amide wax
[4]Vinyltrimethoxysilane
[5]$H_2NC_3H_6Si(OCH_3)_3$
[6]1,8-Diazabicyclo[5.4.0]-7-undecene The addition of the silicon compound (C) gave an effect of improving the curability. The adhesiveness was also good.

Examples 23 and 24, and Comparative Examples 18 and 19

The organic polymer (A-1) was used as a component (A), and in accordance with each formulation shown in Table 7, fillers, a dehydrating agent, amine compounds (B) as an adhesion-imparting agent and a curing catalyst, and a silicon compound (C) were weighed, and then a mixer was used to produce each one-component curable composition therefrom. The composition was sealed up in an aluminum cartridge.

Each of the curable compositions was pushed out from the cartridge under the condition of a constant temperature of 23° C. and a constant humidity of 50% RH, and a spatula was used to fill the composition into a frame having a thickness of about 5 mm. The surface thereof was made into a flat form. This time was defined as the curing start time. In the same way as described above, the skin formation time was measured.

The one-component curable composition was pushed out to be caused to adhere closely to each of substrates (a glass, an anodic oxidation aluminum, a stainless steel plate, a vinyl chloride steel plate, a hard vinyl chloride, and a polycarbonate) The resultant was allowed to stand still for curing under the condition of a constant temperature of 23° C. and a constant humidity of 50% RH for 7 days, and then a 90-degree hand peel test was made. The breakdown state of the cured product was observed, and the cohesion failure ratio was measured. In the table, a product having a cohesion failure ratio of 100%, 50% or more and less than 100%, 10% or more and less than 50%, or less than 10% is represented by A, B, C or D, respectively. The results are shown in Table 7.

As shown in the table, the use of the amine compounds (B) together with the silicon compound (C) caused an improvement in the curability, and further an increase in the addition amount of the silicon compound made it possible to give a one-component curable composition having a very high curability. All of the compositions exhibited very good adhesiveness onto the various substrates.

What is claimed is:

1. A curable composition, comprising:
(A) one or more polymers having a silicon-containing group which is crosslinkable by forming siloxane bonds,
(B) an amine compound, and
(C) a silicon compound represented by the following general formula (2):

$$R^3{}_{4-c-d}Y_c SiX_d \tag{2}$$

(wherein $R^3$ represents a substituted or unsubstituted hydrocarbon group having 1 to 20 carbon atoms, or a triorganosiloxy group represented by $(R'')_3SiO$— (wherein each R" is independently a substituted or unsubstituted hydrocarbon group having 1 to 20 carbon

TABLE 7

|  |  |  | Examples | | Comparative Examples | |
|---|---|---|---|---|---|---|
| Composition (parts by weight) | | | 23 | 24 | 18 | 19 |
| Polymer (A) | A-1 | | 100 | 100 | 100 | 100 |
| Fillers | Hakuenka CCR[(1)] | Shiraishi Kogyo Co., Ltd. | 50 | 50 | 50 | 50 |
|  | Whiton SB[(2)] | Shiraishi Calcium Co., Ltd. | 50 | 50 | 50 | 50 |
| Anti-sagging agent | Disparlon #6500[(3)] | Kusumoto Chemicals Co., Ltd. | 2 | 2 | 2 | 2 |
| Ultraviolet absorber | TINUVIN 327[(4)] | Ciba-Geigy Japan Limited | 1 | 1 | 1 | 1 |
| Photostabilizer | Sanol LS-770[(5)] | Sankyo Co., Ltd. | 1 | 1 | 1 | 1 |
| Dehydrating agent | A171[(6)] | Nippon Unicar Co., Ltd. | 2 | 2 | 2 | 2 |
| Amine compound (B) | A1110[(7)] | Nippon Unicar Co., Ltd. | 3 | 3 | 3 | 3 |
|  | DBU[(8)] | San-Apro Co., Ltd. | 0.5 | 0.5 | 0.5 | |
| Silicon compound (C) | Fluorotriethoxysilane | AZmax Co., Ltd. | 0.5 | 1 | | |
| Organic tin compound | Neostanne U-220[(9)] | Nitto Kasei Co., Ltd. | | | | 0.15 |
| Curability | Skin formation time | (minutes) | 55 | <1 | 112 | 20 |
| Adhesiveness | 90° Hand peel | Glass | A | A | A | A |
|  |  | Anodic oxidation aluminum | A | A | A | A |
|  |  | Stainless steel | A | A | A | A |
|  |  | Vinyl chloride steel plate | A | A | A | A |
|  |  | Hard vinyl chloride | A | A | A | A |
|  |  | Polycarbonate | C | A | C | A |

[(1)]Colloidal calcium carbonate
[(2)]Ground calcium carbonate
[(3)]Aliphatic amide wax
[(4)]2-(3,5-Di-t-butyl-2-hydroxyphenyl)-5-chlorobenzotriazole
[(5)]Bis(2,2,6,6-tetramethyl-4-piperidyl) sebacate
[(6)]Vinyltrimethoxysilane
[(7)]$H_2NC_3H_6Si(OCH_3)_3$
[(8)]1,8-Diazabicyclo[5.4.0]-7-undecene
[(9)]Dibutyltin (IV) bisacetylacetonate Metal (Sn) content: 27.5% atoms), each Y independently represents a group selected from a hydroxyl group, alkoxy groups, alkenyloxy groups, and acyloxy groups, X is an electron withdrawing group, c is 1, 2, or 3, and d is 1, 2, or 3 provided that c+d is 4 or less), wherein at least one electron withdrawing group of the component (C) is a group selected from the group consisting of halogens, acyl groups, alkoxycarbonyl groups, a nitro group, a cyano group, and a sulfonyl group, and an electron withdrawing aryl group represented by the following general formula (4):

$$—(Ar)V_f \qquad (4)$$

(wherein Ar represents an aromatic ring, and V is a group with which a hydrogen atom on the aromatic ring is substituted, and which is a group selected from the group consisting of halogens, acyl groups, alkoxycarbonyl groups, a nitro group, a cyano group, a sulfonyl group, and perfluoroalkyl groups, and f is 1 or more and is a number of hydrogen atoms on the aromatic ring which are able to be substituted), wherein the amine compound (B) is contained in an amount of 0.001 to 20 parts by weight and the silicon compound (C) is contained in an amount of 0.001 to 20 parts by weight for 100 parts by weight of the component (A), and wherein the polymer(s) of the component (A) is/are one or more organic polymers having at least one main chain skeleton selected from the group consisting of polyoxyalkylene polymers, saturated hydrocarbon polymers, and (meth)acrylic acid ester polymers.

2. The curable composition according to claim 1,
wherein the polymer(s) of the component (A) has/have a number-average molecular weight of 3,000 to 100,000, and has/have one or more silicon-containing groups represented by the following general formula (1), on average per molecule:

$$—(SiR^1_{2-b}Z_bO)_1—SiR^2_{3-a}Z_a \qquad (1)$$

(wherein $R^1$ and $R^2$ each independently represent a substituted or unsubstituted hydrocarbon group having 1 to 20 carbon atoms, or a triorganosiloxy group represented by $(R')_3SiO$— (wherein R's are each independently a substituted or unsubstituted hydrocarbon group having 1 to 20 carbon atoms), $Z_a$ and $Z_b$ each independently represent a hydroxyl or a hydrolyzable group, a is 0, 1, 2, or 3, b is 0, 1, or 2 provided that a case wherein a and b are 0 at the same time is not caused, and 1 is 0 or an integer of 1 to 19).

3. The curable composition according to claim 2, wherein Z is an alkoxy group.

4. The curable composition according to claim 1, wherein the molecular weight of the component (C) is 3,000 or less.

5. The curable composition according to claim 1, wherein at
least one electron withdrawing group of the component (C) is an electron withdrawing aryl group.

6. The curable composition according to claim 1, wherein the aromatic ring Ar in the following general formula (4):

$$—(Ar)V_f \qquad (4)$$

(wherein V is a group with which a hydrogen atom on the aromatic ring is substituted, and which is a group selected from halogens, acyl groups, alkoxycarbonyl groups, a nitro group, a cyano group, a sulfonyl group, and perfluoroalkyl groups, and f is 1 or more and is a number of hydrogen atoms on the aromatic ring which are able to be substituted) is a benzene ring (wherein f is an integer of 1 to 5).

7. The curable composition according to claim 1, wherein at least one electron withdrawing group of the component (C) is fluorine.

8. A one-component curable composition, using the curable composition according to claim 1.

9. A sealing compound, using the curable composition according to claim 1.

10. An adhesive, using the curable composition according to claim 1.

11. A curable composition
comprising:
(A) one or more polymers having a silicon-containing group which is crosslinkable by forming siloxane bonds,
(B) an amine compound, and
(C) a silicon compound represented by the following general formula (2):

$$R^3_{4-c-d}Y_cSiX_d \qquad (2)$$

(wherein $R^3$ represents a substituted or unsubstituted hydrocarbon group having 1 to 20 carbon atoms, or a triorganosiloxy group represented by $(R'')_3SiO$— (wherein each R'' is independently a substituted or unsubstituted hydrocarbon group having 1 to 20 carbon atoms), each Y independently represents a group selected from a hydroxyl group, alkoxy groups, alkenyloxy groups, and acyloxy groups, X is an electron withdrawing group, c is 1, 2, or 3, and d is 1, 2 or 3 provided that c+d is 4 or less), wherein at least one electron withdrawing group of the component (C) is a group selected from the group consisting of halogens, acyl groups, alkoxycarbonyl groups, a nitro group, a cyano group, a sulfonyl group, and an electron withdrawing aryl group represented by the following general formula (4):

$$—(Ar)V_f \qquad (4);$$

(wherein Ar represents an aromatic ring, and V is a group with which a hydrogen atom on the aromatic ring is substituted, and which is a group selected from halogens, acyl groups, alkoxycarbonyl groups, a nitro group, a cyano group, a sulfonyl group, and perfluoroalkyl groups, and f is 1 or more and is a number of hydrogen atoms on the aromatic ring which are able to be substituted), wherein the amine compound (B) is contained in an amount of 0.001 to 20 parts by weight and the silicon compound (C) is contained in an amount of 0.001 to 20 parts by weight for 100 parts by weight of the component (A), and wherein the component (A) is partially or wholly a polymer having a silicon-containing group wherein the total number of hydrolyzable and hydroxyl groups which are bonded to its silicon atom is 3.

12. A curable composition comprising:
(A) one or more polymers having a silicon-containing group which is crosslinkable by forming siloxane bonds,
(B) an amine compound, and
(C) a silicon compound represented by the following general formula (2):

$$R^3_{4-c-d}Y_cSiX_d \qquad (2)$$

(wherein $R^3$ represents a substituted or unsubstituted hydrocarbon group having 1 to 20 carbon atoms, or a triorganosiloxy group represented by $(R'')_3SiO$—

(wherein each R" is independently a substituted or unsubstituted hydrocarbon group having 1 to 20 carbon atoms), each Y independently represents a group selected from a hydroxyl group, alkoxy groups, alkenyloxy groups, and acyloxy groups, X is an electron withdrawing group, c is 1, 2, or 3, and d is 1, 2 or 3 provided that c+d is 4 or less), wherein at least one electron withdrawing group of the component (C) is a group selected from the group consisting of halogens, acyl groups, alkoxycarbonyl groups, a nitro group, a cyano group, a sulfonyl group, and an electron withdrawing aryl group represented by the following general formula (4):

  (4)

(wherein Ar represents an aromatic ring, and V is a group with which a hydrogen atom on the aromatic ring is substituted, and which is a group selected from halogens, acyl groups, alkoxycarbonyl groups, a nitro group, a cyano group, a sulfonyl group, and perfluoroalkyl groups, and f is 1 or more and is a number of hydrogen atoms on the aromatic ring which are able to be substituted), wherein the amine compound (B) is contained in an amount of 0.001 to 20 parts by weight and the silicon compound (C) is contained in an amount of 0.001 to 20 parts by weight for 100 parts by weight of the component (A), wherein the polymer(s) of the component (A) has/have a number-average molecular weight of 3,000 to 100,000, and has/have one or more silicon-containing groups represented by the following general formula (1), on average per molecule:

  (1)

(wherein $R^1$ and $R^2$ each independently represent a substituted or unsubstituted hydrocarbon group having 1 to 20 carbon atoms, or a triorganosiloxy group represented by $(R')_3SiO$— (wherein R's are each independently a substituted or unsubstituted hydrocarbon group having 1 to 20 carbon atoms), $Z_a$ and $Z_b$ each independently represent a methoxy group, a is 0, 1, 2, or 3, b is 0, 1, or 2 provided that a case wherein a and b are 0 at the same time is not caused, and l is 0 or an integer of 1 to 19.

13. A curable composition comprising:
(A) one or more polymers having a silicon-containing group which is crosslinkable by forming siloxane bonds,
(B) an amine compound, and
(C) bis(pentafluorophenyl)dimethoxysilane or fluorotriethoxysilane, wherein the amine compound (B) is contained in an amount of 0.001 to 20 parts by weight and the silicon compound (C) is contained in an amount of 0.001 to 20 parts by weight for 100 parts by weight of the component (A).

* * * * *